(12) United States Patent
Lee et al.

(10) Patent No.: US 9,758,380 B2
(45) Date of Patent: Sep. 12, 2017

(54) GRAPHENE QUANTUM DOT AND PREPARING METHOD OF THE SAME

(71) Applicant: RESEARCH & BUSINESS FOUNDATION SUNGKYUNKWAN UNIVERSITY, Suwon-si (KR)

(72) Inventors: Hyoyoung Lee, Suwon-si (KR); Yong Hun Shin, Ansan-si (KR); Daesun Hyun, Suwon-si (KR); Jintaek Park, Pyeongtaek-si (KR); Kyoung Soo Kim, Yongin-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 97 days.

(21) Appl. No.: 14/836,826

(22) Filed: Aug. 26, 2015

(65) Prior Publication Data

US 2016/0060121 A1 Mar. 3, 2016

(30) Foreign Application Priority Data

Aug. 27, 2014 (KR) ........................ 10-2014-0112479

(51) Int. Cl.
 *C01B 31/04* (2006.01)
 *C01B 31/00* (2006.01)
 *B82Y 40/00* (2011.01)
 *B82Y 30/00* (2011.01)

(52) U.S. Cl.
 CPC .......... *C01B 31/0446* (2013.01); *C01B 31/00* (2013.01); *B82Y 30/00* (2013.01); *B82Y 40/00* (2013.01); *Y10S 977/774* (2013.01)

(58) Field of Classification Search
 CPC ..... C01B 31/0446; C01B 31/00; B82Y 30/00; B82Y 40/00; Y10S 977/774
 USPC ........................................................ 428/402
 See application file for complete search history.

(56) References Cited

U.S. PATENT DOCUMENTS

| | | | | |
|---|---|---|---|---|
| 9,287,518 | B2 * | 3/2016 | Lee | ............ H01L 51/5012 |
| 9,388,049 | B2 * | 7/2016 | Lee | ............ C01B 31/043 |
| 9,505,623 | B1 * | 11/2016 | Qin | ............ C01B 31/0446 |
| 2016/0064681 | A1 * | 3/2016 | Lee | ............ H01L 51/502 |
| | | | | 257/13 |

FOREIGN PATENT DOCUMENTS

| KR | 10-2012-0029332 A | 3/2012 |
|---|---|---|
| KR | 10-2014-0065275 A | 5/2014 |

* cited by examiner

*Primary Examiner* — Leszek Kiliman
(74) *Attorney, Agent, or Firm* — NSIP Law

(57) ABSTRACT

The present disclosure relates to graphene quantum dot and a method for preparing the graphene quantum dot.

10 Claims, 42 Drawing Sheets

GRAPHENE QUANTUM DOT AND PREPARING METHOD OF THE SAME

CROSS-REFERENCE TO RELATED APPLICATION

This application claims the benefit under 35 USC 119(a) of Korean Patent Application No. 10-2014-0112479 filed on Aug. 27, 2014, in the Korean Intellectual Property Office, the entire disclosures of which are incorporated herein by reference for all purposes.

TECHNICAL FIELD

The present disclosure relates to graphene quantum dot and a method for preparing the graphene quantum dot.

BACKGROUND

With the latest development of the nanotechnologies, high sensitivity, high specificity, and high selectivity of nano-materials such as nano-particles, nano-wires and nano-devices have been applied to various fields. Among the various nano-materials, graphene has been recently subject to researches in view of its superior electrical, physical, and optical properties. In graphene, in which carbon atoms form a hexagonal structure, each carbon atom is bonded to its peripheral atoms through a strong covalent bond, and as one carbon atom has one non-bonded electron, the electrons easily move in a two-dimensional structure within the graphene, so that the graphene has a current density of about $10^8$ A/cm$^2$, which is about 100 times greater than that of a copper per unit area at a room temperature. In addition, the mechanical strength of the graphene is about 200 or more times stronger than that of steel, and since the flexibility of the graphene is also excellent, the graphene does not lose its electrical conductivity even when it is stretched or folded, so that the graphene can be applied to a flexible display, a wearable display or others. However, the graphene has a disadvantage in view of application thereof because aggregation occurs among graphenes, and thereby, significantly deteriorating a degree of dispersion in a common solvent.

As one of measures to overcome this disadvantage, a small nano-sized graphene quantum dot method has been researched and developed over recent years. Graphene quantum dot compound is a zero (0)-dimensional material having a size of a few nanometers to tens of nanometers, and since the compound is easily dispersed in various organic solvents and has a property of light emission over various ranges, it can be applied to bio-imaging research, light emitting devices, photoelectronic devices or others.

Korean Patent Application Publication No. 10-2012-0029332 relates to graphene quantum dot light emitting device and a fabricating method thereof. Most of conventionally reported methods for synthesizing graphene quantum dot use graphene oxide as a starting material. This method is disadvantageous in that the synthesis process is complicated, and a yield rate of the graphene quantum dot is quite low. In addition, relevant experiments are carried out under a strong acidic condition, and since a large amount of salt is added for neutralization during a purification process, the process becomes complicated. Further, since a toxic compound is used as an oxidant, it may cause environmental pollution.

SUMMARY

In view of the foregoing, the present disclosures provide graphene quantum dot and a method for preparing the graphene quantum dot.

However, problems to be solved by the present disclosure are not limited to the above-described problems. Although not described herein, other problems to be solved by the present disclosure can be clearly understood by those skilled in the art from the following descriptions.

In a first aspect of the present disclosure, there is provided a method for preparing graphene quantum dot, comprising: adding potassium peroxymonosulfate (oxone) to a carbon material to form graphene quantum dot through a solvothermal redox reaction, a sono fenton reaction, or a sono photo fenton reaction of the carbon material.

In a second aspect of the present disclosure, there is provided graphene quantum dot, which is prepared by the method according to the first aspect of the present disclosures, wherein the graphene quantum dot has a size of about 100 nm or less and a height of about 10 nm or less.

Conventionally reported graphene quantum dots have been prepared by using graphene oxide under a strong acidic condition through chemical exfoliation using an oxidant. This method is disadvantageous in that due to the complicated preparation method, it takes a long time to prepare the graphene quantum dots; since the method is carried out under the strong acidic condition, a large amount of salt needs to be added during a purification process; and a complicated purification process is necessary to eliminate the salt. Further, since the conventional method has used a potassium permanganate (KMnO$_4$), which is a toxic compound, as an oxidant, the stability is not superior, environmental pollution would be caused, and further, eliminating the permanganate is difficult.

However, in accordance with the present disclosure, it is possible to prepare graphene quantum dot by using various carbon materials as a starting material through a solvothermal redox reaction, a sono fenton reaction, or a sono photo fenton reaction; it is possible to improve stability by using potassium peroxymonosulfate(oxone), which is neutral, and not acidic, as an oxidant; and it is unnecessary to further carry out acid wastewater processing. Furthermore, the preparation process according to the present disclosures is simple, and the purification process is also simple as the graphene quantum dot is prepared under an organic solvent condition, cost reduction is achieved.

DETAILED DESCRIPTION

Figure 1:
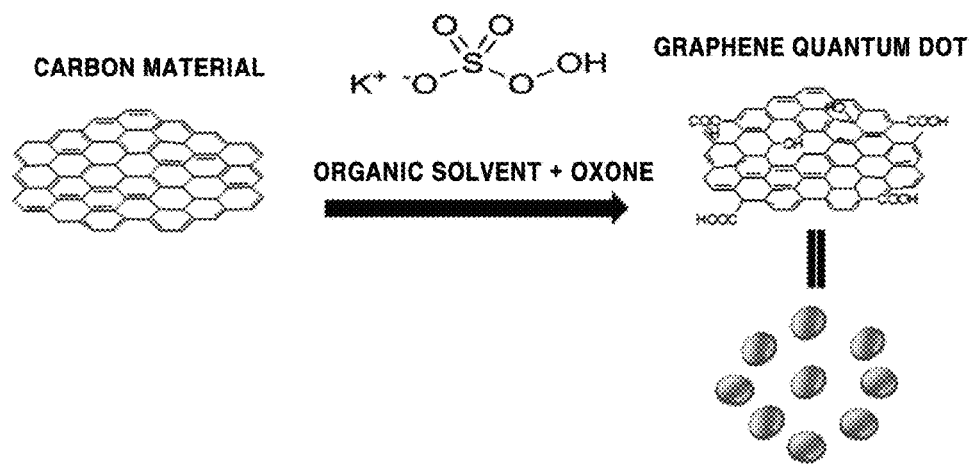
FIG. 1 is a schematic view roughly showing a method for preparing graphene quantum dot in an embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document of the present disclosure, the term "connected to" or "coupled to" that is used to designate a connection or coupling of one element to another element includes both a case that an element is "directly connected or coupled to" another element and a case that an element is "electronically connected or coupled to" another element via still another element.

Through the whole document of the present disclosure, the term "on" that is used to designate a position of one element with respect to another element includes both a case that the one element is adjacent to the another element and a case that any other element exists between these two elements.

Through the whole document of the present disclosure, the term "comprises or includes" and/or "comprising or including" used in the document means that one or more other components, steps, operation and/or existence or addition of elements are not excluded in addition to the described components, steps, operation and/or elements unless context dictates otherwise. The term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document of the present disclosure, the term "step of" does not mean "step for".

Through the whole document of the present disclosure, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document of the present disclosure, a phrase in the form "A and/or B" means "A or B, or A and B".

Through the whole document of the present disclosure, the term "graphene" refers to "a conductive material in which carbon atoms are arranged in a two-dimensional honeycomb form and which has a thickness of one atomic layer".

Through the whole document of the present disclosure, the term "graphene quantum dot" refers to "a zero (0)-dimensional material which has a size of about 100 nm or less and a height of about 10 nm or less."

Through the whole document of the present disclosure, the term "sono fenton reaction" refers to "a reaction using sonication by using a fenton oxidant." For example, the fenton oxidant may include a member selected from the group consisting of potassium peroxymonosulfate (oxone), ferric chloride, hydrogen peroxide, $Fe^{3+}$, $Fe^{2+}$, $H_2O_2$, an OH-hydroxyl radical, a SO-sulfate radical, and combinations thereof, but may not be limited thereto.

Through the whole document of the present disclosure, the term "sono photo fenton reaction" refers to "a reaction using a violet light by using a fenton oxidant.

Hereinafter, embodiments and examples of the present disclosure will be explained in detail with reference to the accompanying drawings. However, the present disclosure may not be limited to these embodiments, examples, and drawings.

In a first aspect of the present disclosure, there is provided a method for preparing graphene quantum dot, comprising: adding potassium peroxymonosulfate (oxone) to a carbon material to form graphene quantum dot through a solvothermal redox reaction, a sono fenton reaction, or a sono photo fenton reaction of the carbon material.

FIG. 1 is a schematic view roughly showing the method for preparing graphene quantum dot in accordance with an embodiment of the present disclosure. As shown in FIG. 1, after potassium peroxymonosulfate (hereinafter, referred-to also as 'oxone') is added as an oxidant to the carbon material, the carbon material may be synthesized to be graphene quantum dot through the solvothermal redox reaction, the sono fenton reaction, or the sono photo fenton reaction of the carbon material, but may not be limited thereto. In an embodiment of the present disclosure, the potassium may include a member substituted with an alkali metal selected from the group consisting of lithium, sodium, rubidium, cesium, francium, and combinations thereof, but may not be limited thereto.

In an embodiment of the present disclosure, upon the synthesis of the graphene quantum dot, the oxone, which is neutral, and not acidic, is used as an oxidant so as to improve stability, and since additional acid wastewater processing is unnecessary, the method may be economical.

In an embodiment of the present disclosure, double bond and single bond of carbons contained in the carbon material are disconnected by the solvothermal redox reaction, the sono fenton reaction, or the sono photo fenton reaction of the carbon material. The double bond and the single bond of the carbons contained in the carbon material are disconnected through sulfate radicals and/or hydroxy radicals discharged from the oxone.

In an embodiment of the present disclosure, the carbon material may be dispersed in an organic material, but may not be limited thereto.

In an embodiment of the present disclosure, the organic solvent may include a member selected from the group consisting of dimethylformamide (DMF), an alcohol containing 1 to 5 carbon atoms, dichloromethane (MC), N-methylpyrrolidone (NMP), and combinations thereof, but may not be limited thereto. For example, the alcohol containing 1 to 5 carbon atoms may include a member selected from the group consisting of methanol, ethanol, propanol, butanol, phentanol, and combinations thereof, but may not be limited thereto.

In an embodiment of the present disclosure, the solvothermal redox reaction of the carbon material may include oxidizing the carbon material by adding the oxone to the carbon material, and reducing the oxidized carbon material by performing a hydrothermal reaction, but may not be limited thereto.

In an embodiment of the present disclosure, the sono fenton reaction of the carbon material may be performed by sonication to the carbon material to which the oxone has been added, but may not be limited thereto. For example, graphite may be used as the carbon material, but may not be limited thereto.

In an embodiment of the present disclosure, the sono photo fenton reaction of the carbon material may be performed by UV irradiation and sonication to the carbon material to which the oxone has been added, but may not be limited thereto. For example, graphene oxide or graphite may be used as the carbon material, but may not be limited thereto.

In an embodiment of the present disclosure, the carbon material may include a member selected from the group consisting of graphite, a carbon nanotube, a carbon fiber, charcoal, and combinations thereof, but may not be limited thereto.

In a second aspect of the present disclosure, there is provided graphene quantum dot, which is prepared by the method according to the first aspect of the present disclosures, wherein the graphene quantum dot has a size of about 100 nm or less and a height of about 10 nm or less.

In an embodiment of the present disclosure, the graphene quantum dot may have a size of about 100 nm or less and a height of about 10 nm or less, and for example, the graphene quantum dot may have a size of from about 1 nm or about 100 nm, from about 1 nm to about 90 nm, from about 1 nm to about 80 nm, from about 1 nm to about 70 nm, from about 1 nm to about 60 nm, from about 1 nm to about 50 nm, from about 1 nm to about 40 nm, from about 1 nm to about 30 nm, from about 1 nm to about 20 nm, from about 1 nm to about 10 nm, or from about 1 nm to about 5 nm, and the graphene quantum dot may have a height of from about 1 nm to about 10 nm, from about 1 nm to about 9 nm, from about 1 nm to about 8 nm, from about 1 nm to about 7 nm, from about 1 nm to about 6 nm, from about 1 nm to about 5 nm, from about 1 nm to about 4 nm, from about 1 nm to about 3 nm, or from about 1 nm to about 2 nm, but may not be limited thereto. If the size of the graphene quantum dot is constant to be about 100 nm or less, it is easy to adjust the graphene quantum dot upon the synthesis of the graphene quantum dot, and as the size of the graphene quantum dot becomes larger than about 100 nm, problems such as aggregation may occur.

Hereinafter, Example of the present disclosure will be described in detail. However, the present disclosure may not be limited thereto.

Example 1

As a carbon material, graphite (325 mesh Bay Carbon), a carbon nanotube (Iljin Nanotech Co. Ltd.), a carbon fiber (VGCF™, Showa Denko Europe GmbH), and charcoal (Activated charcoal, Sigma-Aldrich Co. LLC) were used, respectively.

1 g of each of the graphite, the carbon nanotube, the carbon fiber, and the charcoal powder was mixed with 2 g oxone in 100 mL dimethylformamide (DMF), to react the mixture in a solvothermal oxidation-reduction reactor (autoclave) for 10 hours.

With respect to measurement testing equipment, starting material and quantum dot surface analysis was conducted by using JEOLJEM-2100 Field Emission Gun HR-TEM, a XE-100 AFM system (Park system, Inc. Korea), and SEM (JSM-6701F/INCA Energy, JEOL), and optical property and chemical property analysis was conducted by using a 8453 UV-vis spectrophotometer (Agilient, Technologies, America), photoluminescence (PL) spectra (Agilient, Technologies, America), and a XPS SIGMA PROBE (Thermo VG).

Preparation of Graphene Quantum Dot Using the Solvothermal Redox Reaction

Each of the graphite, the carbon nanotube, the carbon fiber, and the charcoal powder was mixed with DMF and oxone to react the mixture in a solvothermal redox reactor (autoclave) for 10 hours. After the reaction, the reactant was filtered by using a 100 nm membrane filter. Finally, remaining salt was eliminated through a dialysis bag so that graphene quantum dot was obtained.

Figure 2A:
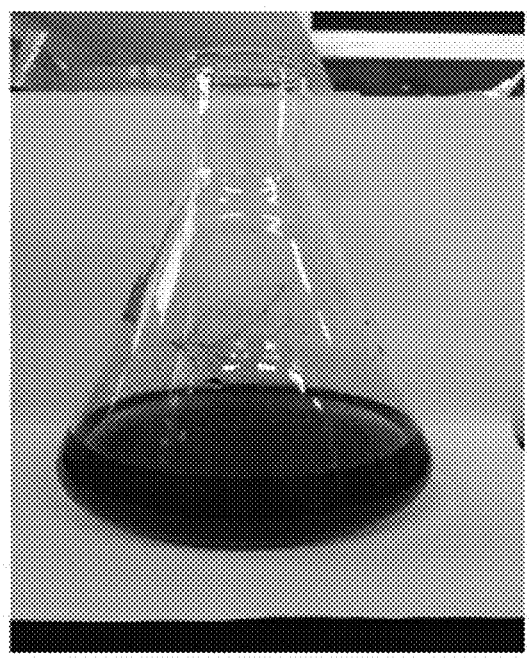
FIG. 2A is an image of a carbon material dispersed in an organic solvent prior to a solvothermal redox reaction in an Example of the present disclosure.
Figure 2B:
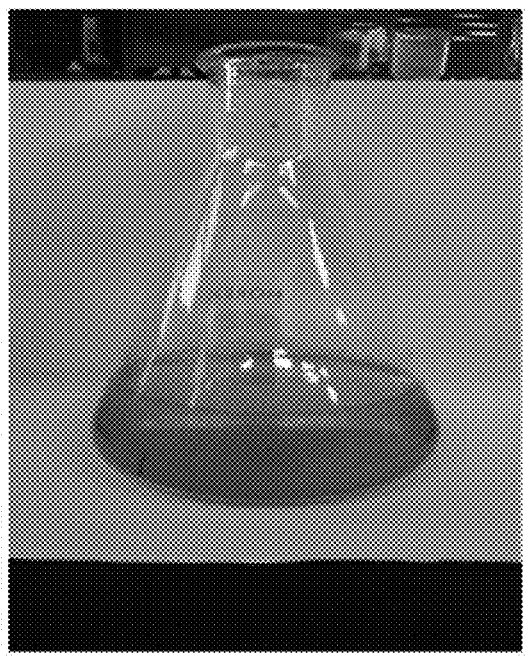
FIG. 2B is an image of a carbon material dispersed in an organic solvent after a solvothermal redox reaction in an Example of the present disclosure.

FIG. 2A is an image of the graphite dispersed in the organic solvent prior to the solvothermal redox reaction in an Example of the present disclosure, and FIG. 2B is an image of the graphite dispersed in the organic solvent after the solvothermal redox reaction in an Example of the present disclosure.

Figure 3A:
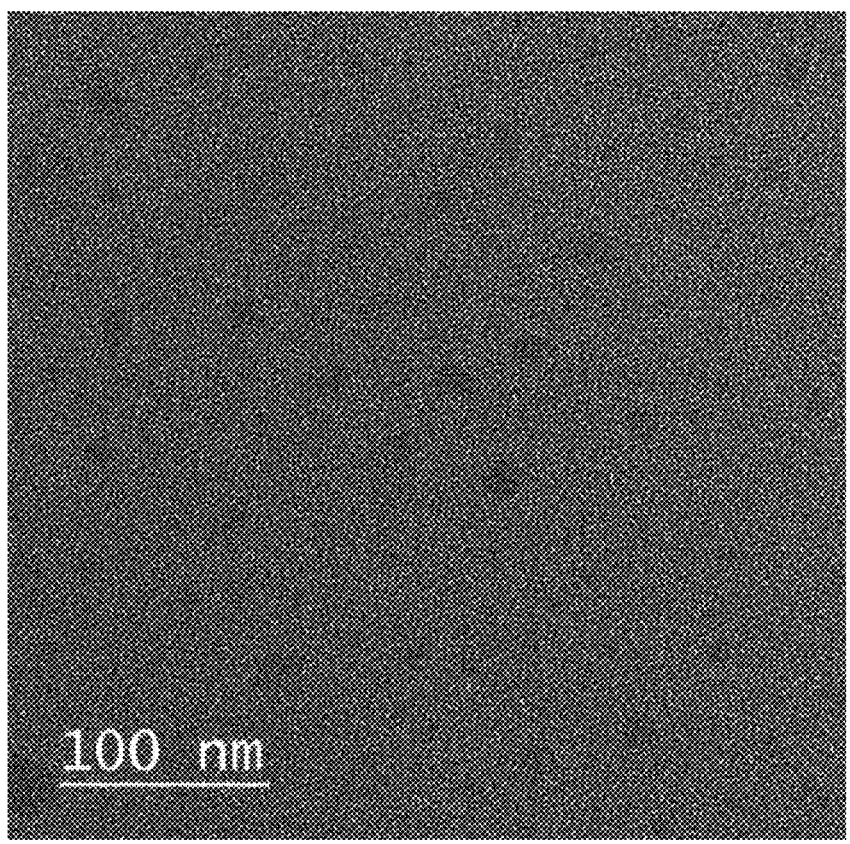
FIG. 3A and FIG. 3B are high-resolution transmission electron microscopy (HR-TEM) images obtained from measuring a size of the graphene quantum dot prepared by using the solvothermal redox reaction in an Example of the present disclosure.
Figure 3B:
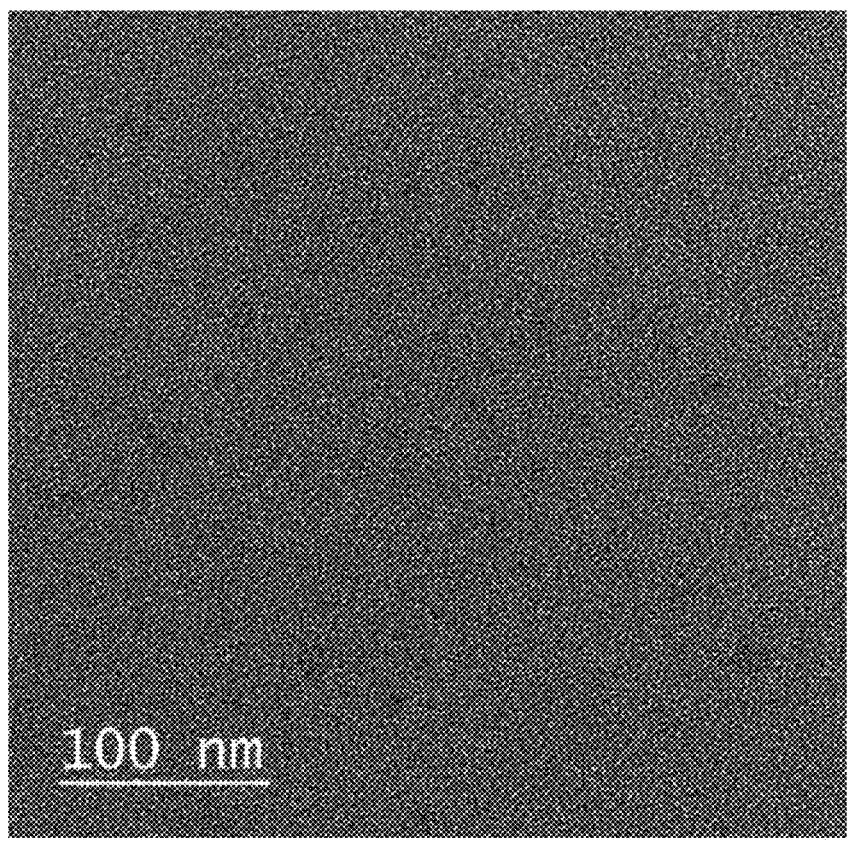

FIG. 3A and FIG. 3B are high-resolution transmission electron microscopy (HR-TEM) images showing sizes of the graphene quantum dots, which were prepared from the graphite and the carbon nanotube, respectively, by using the solvothermal redox reaction, in an Example of the present disclosure. As confirmed from FIG. 3A and FIG. 3B, an average size of the graphene quantum dots prepared by using the graphite and the carbon nanotube, respectively, was from about 2 nm to about 8 nm.

Figure 4A:
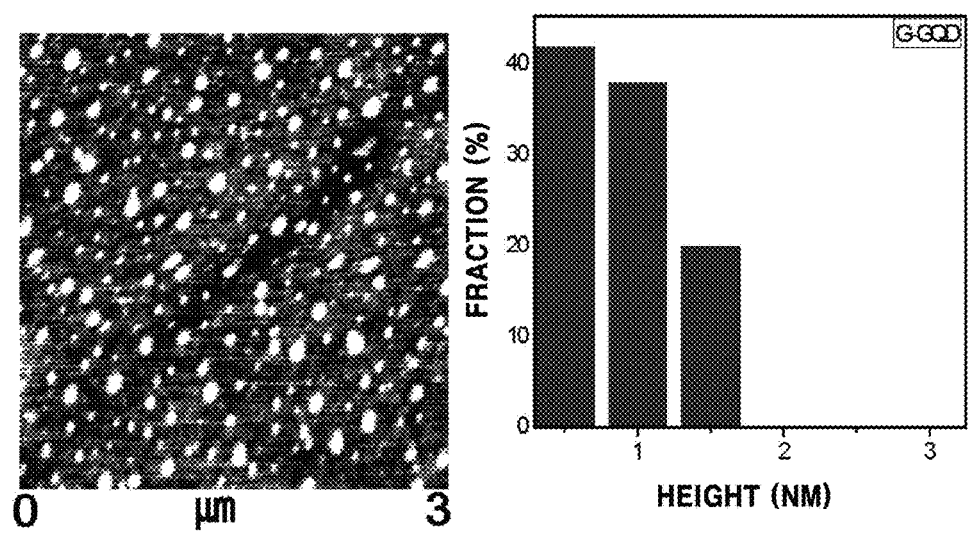
FIG. 4A to FIG. 4D are graphs for sizes and heights of graphene quantum dots, which were prepared from graphite, a carbon nanotube, a carbon fiber, and charcoal, respectively, through the solvothermal redox reaction as measured by using AFM in an Example of the present disclosure.
Figure 4B:
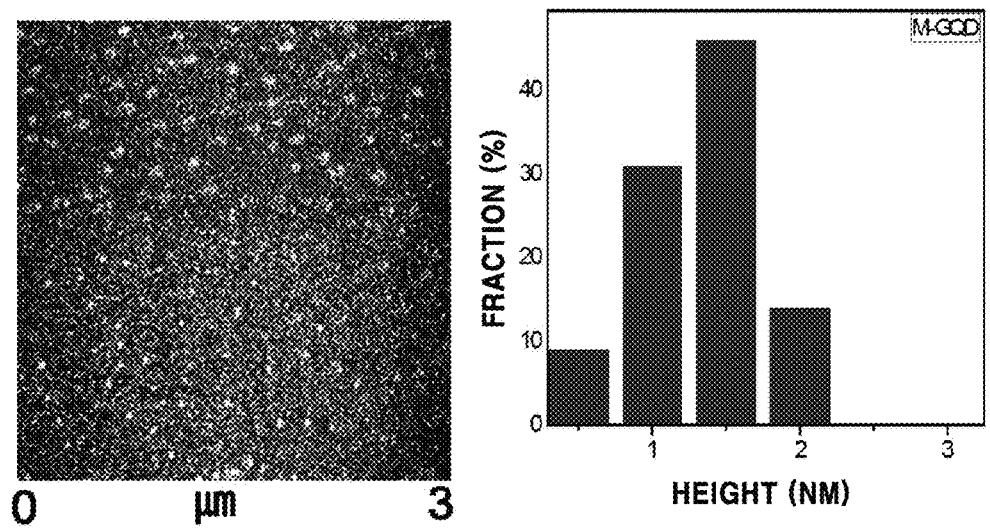
Figure 4C:
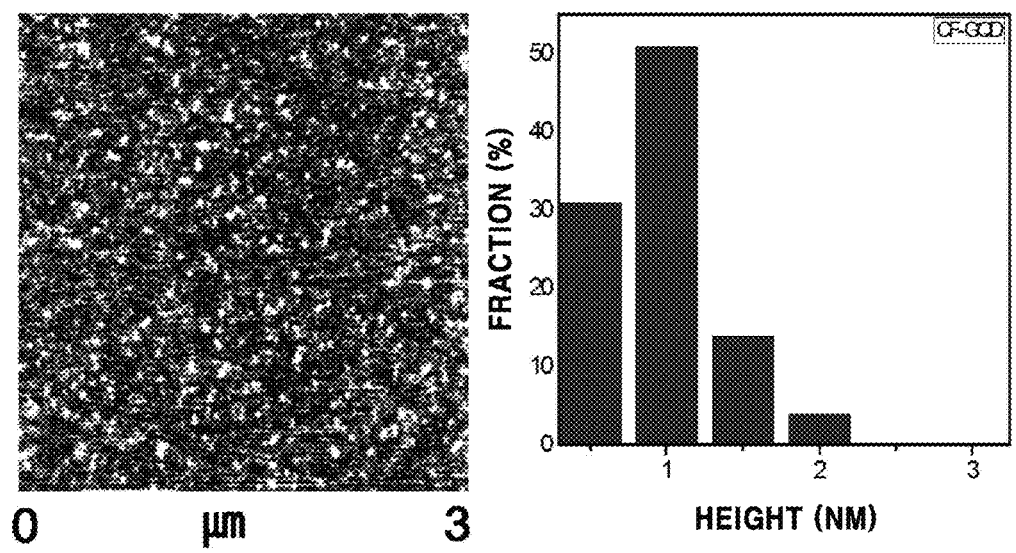
Figure 4D:
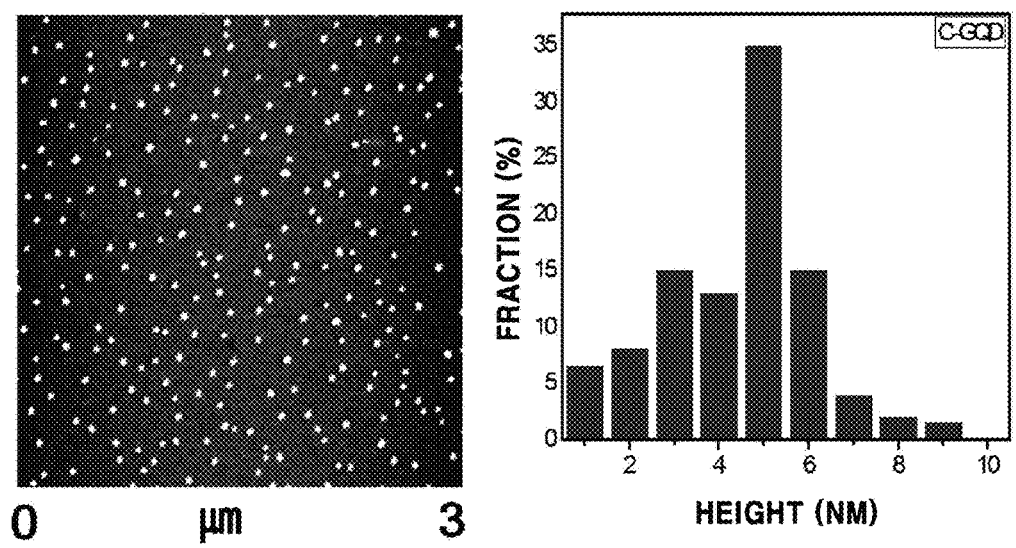
Figure 5A:
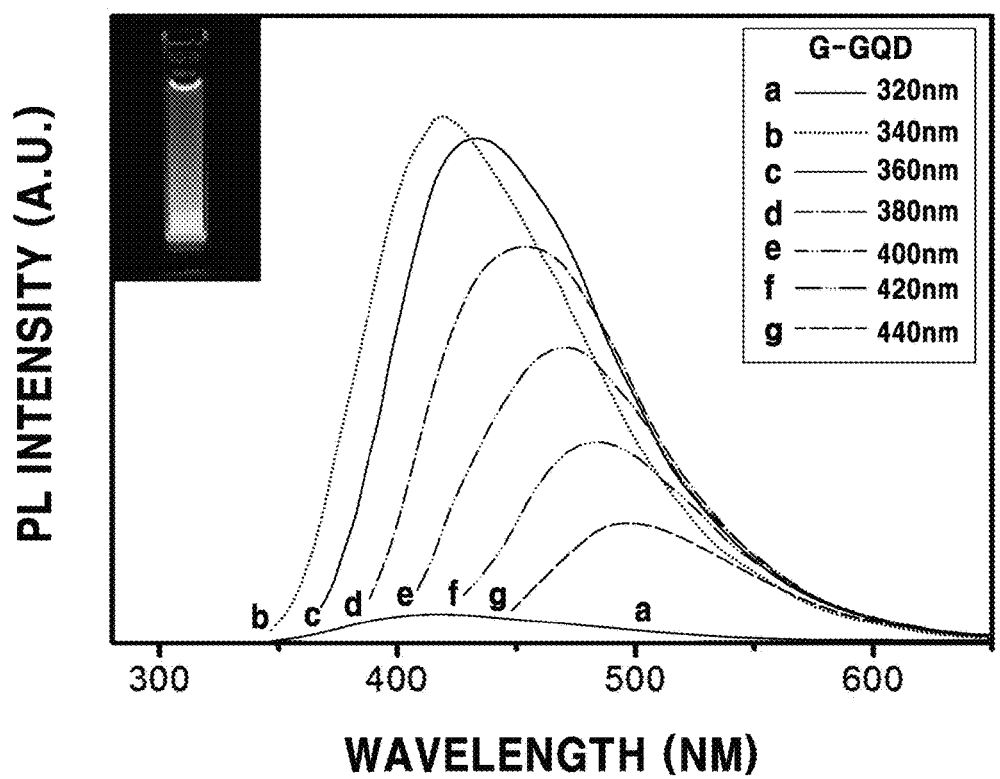
FIG. 5A to FIG. 5D are photoluminescence (PL) spectra of the graphene quantum dots, which were prepared from graphite, a carbon nanotube, a carbon fiber, and charcoal, respectively, through the solvothermal redox reaction in an Example of the present disclosure.
Figure 5B:
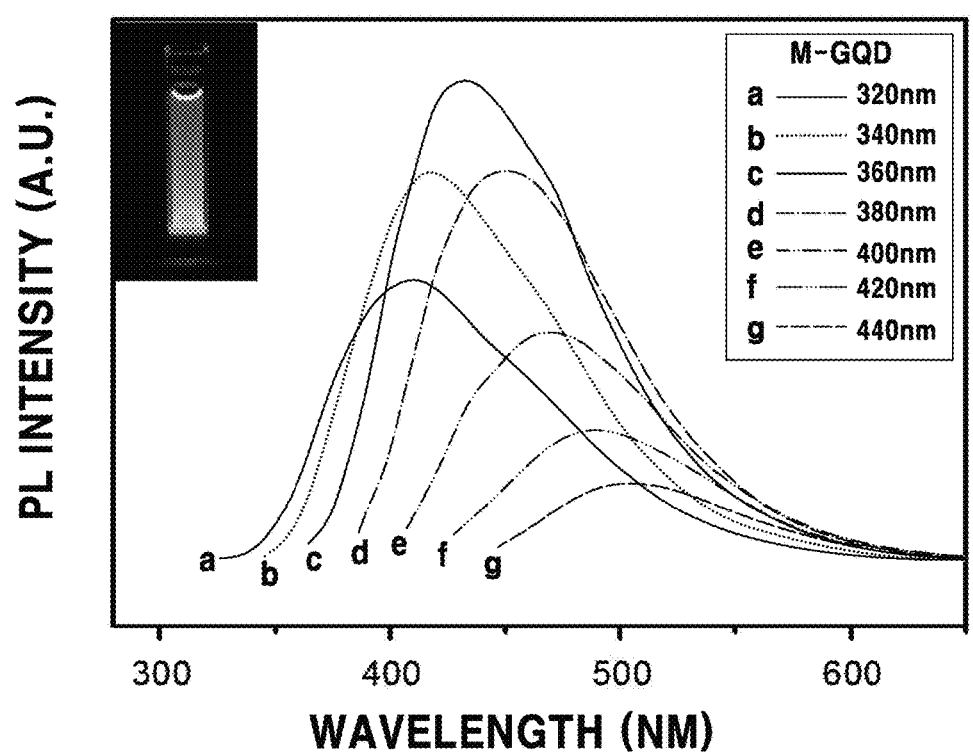
Figure 5C:
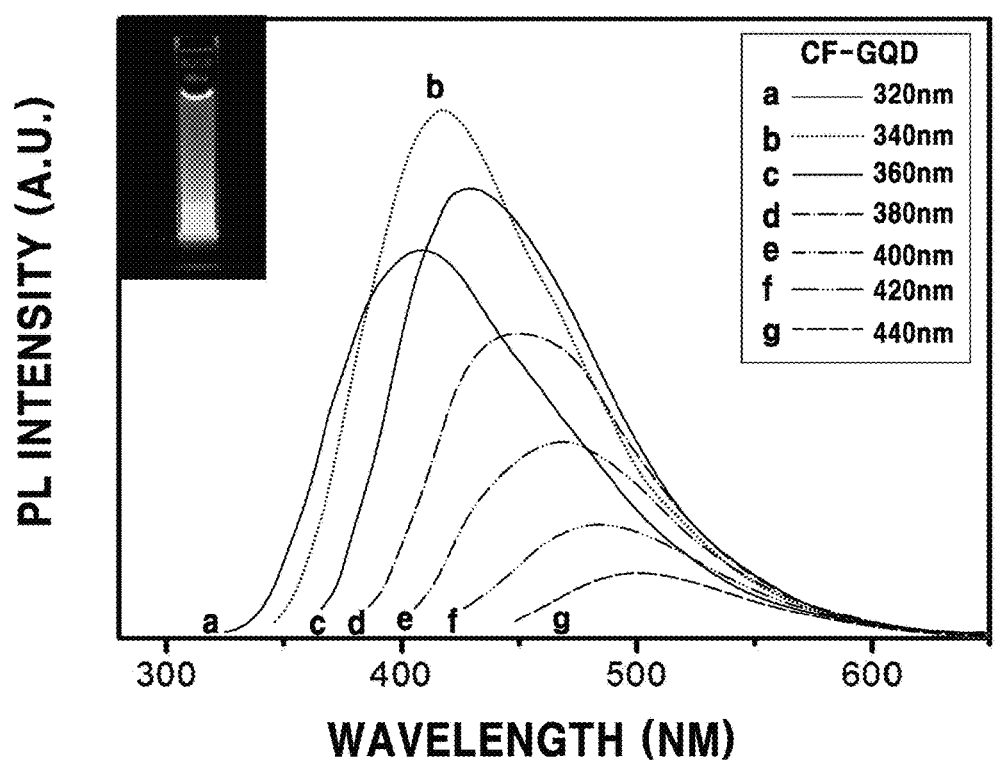
Figure 5D:
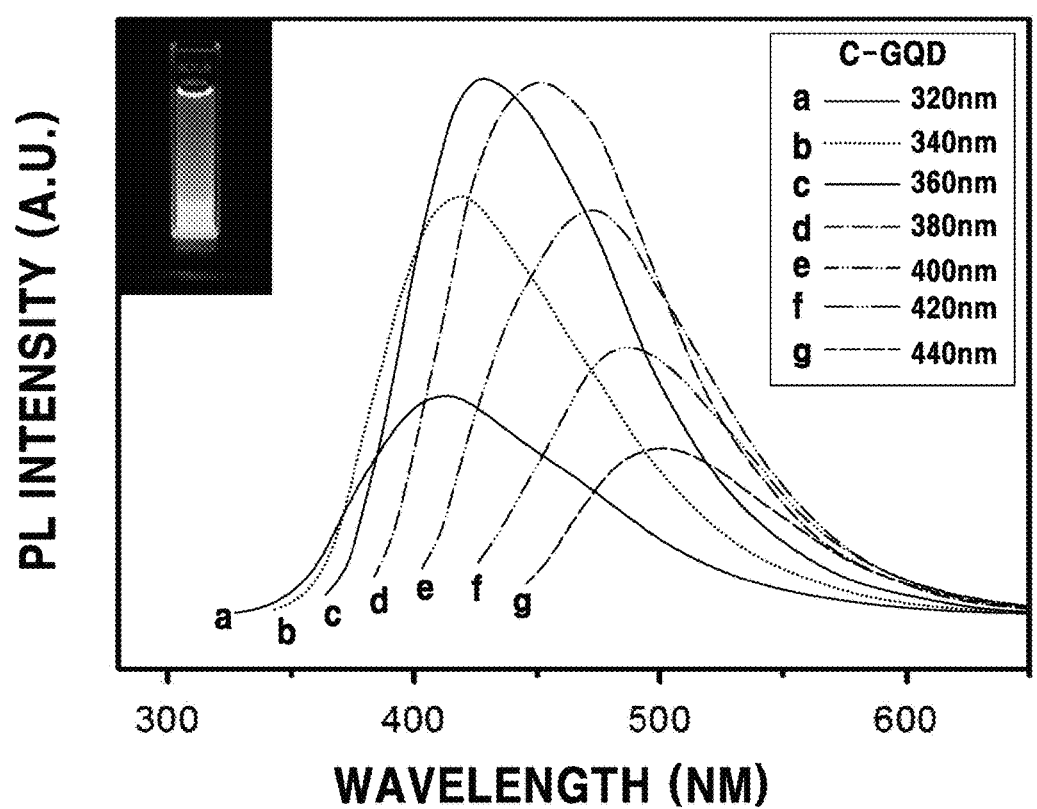
Figure 6A:
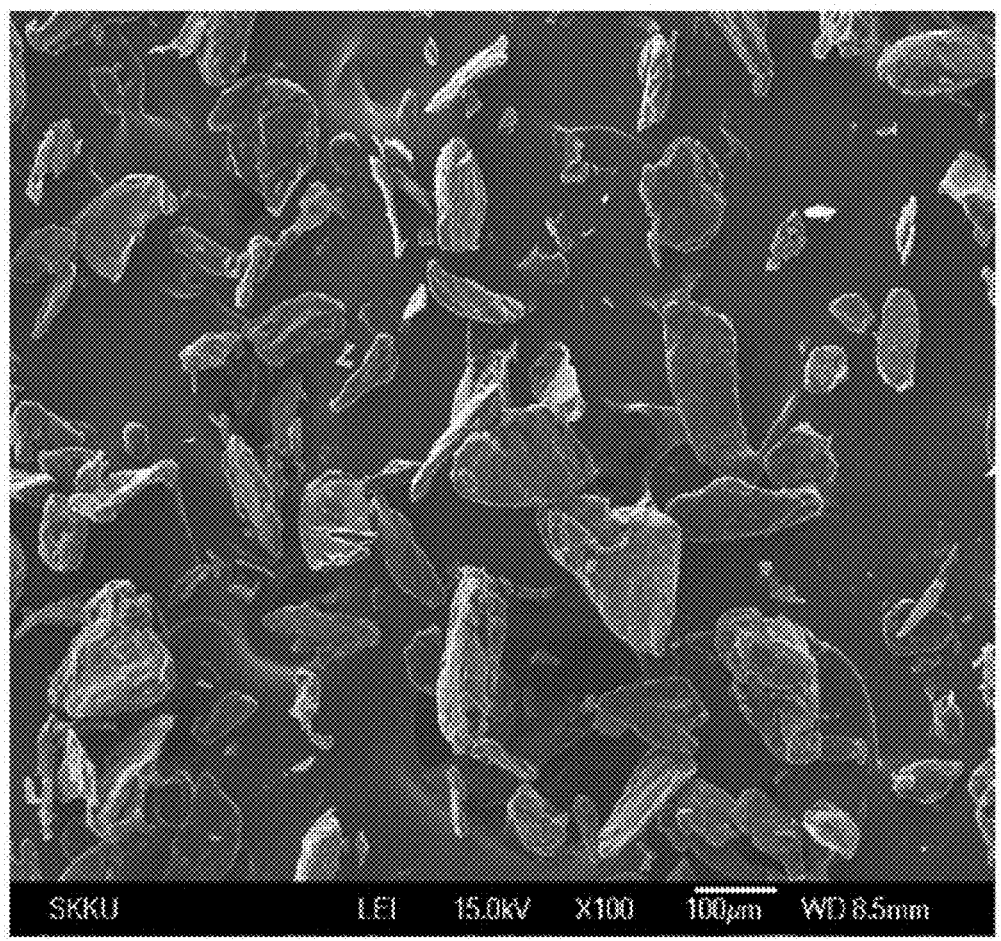
FIG. 6A to FIG. 6D are SEM images of graphite, a carbon nanotube, a carbon fiber, and charcoal, respectively, as a starting material, which are used in the solvothermal redox reaction in an Example of the present disclosure.
Figure 6B:
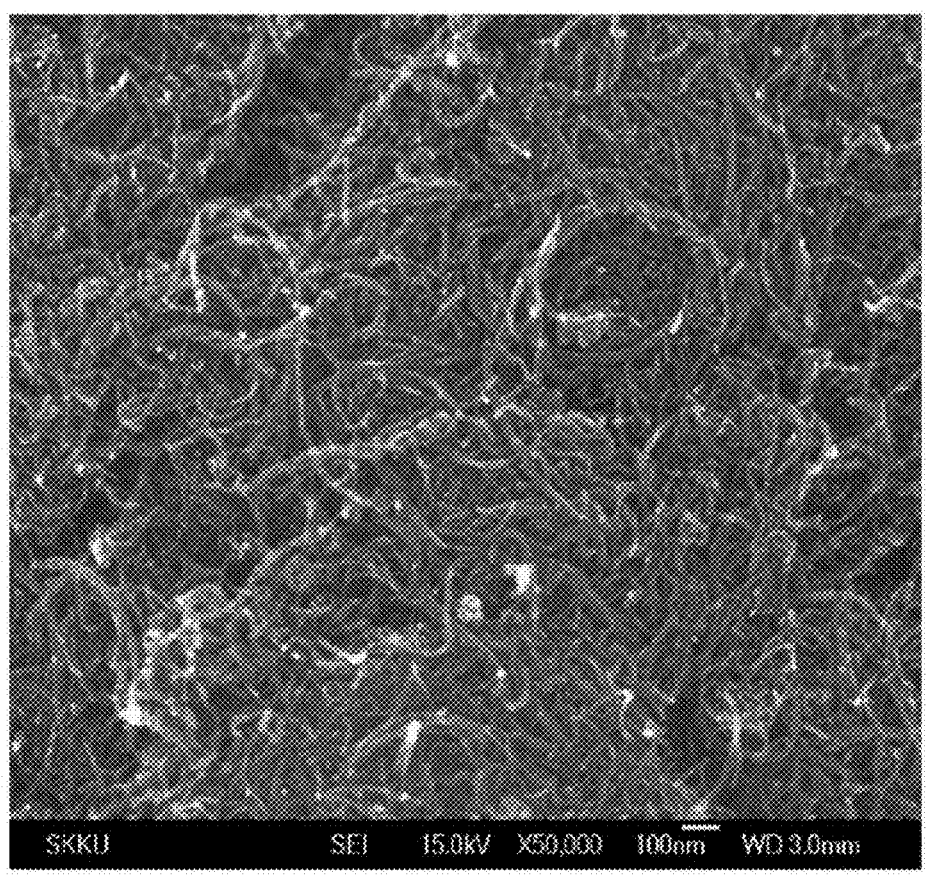
Figure 6C:
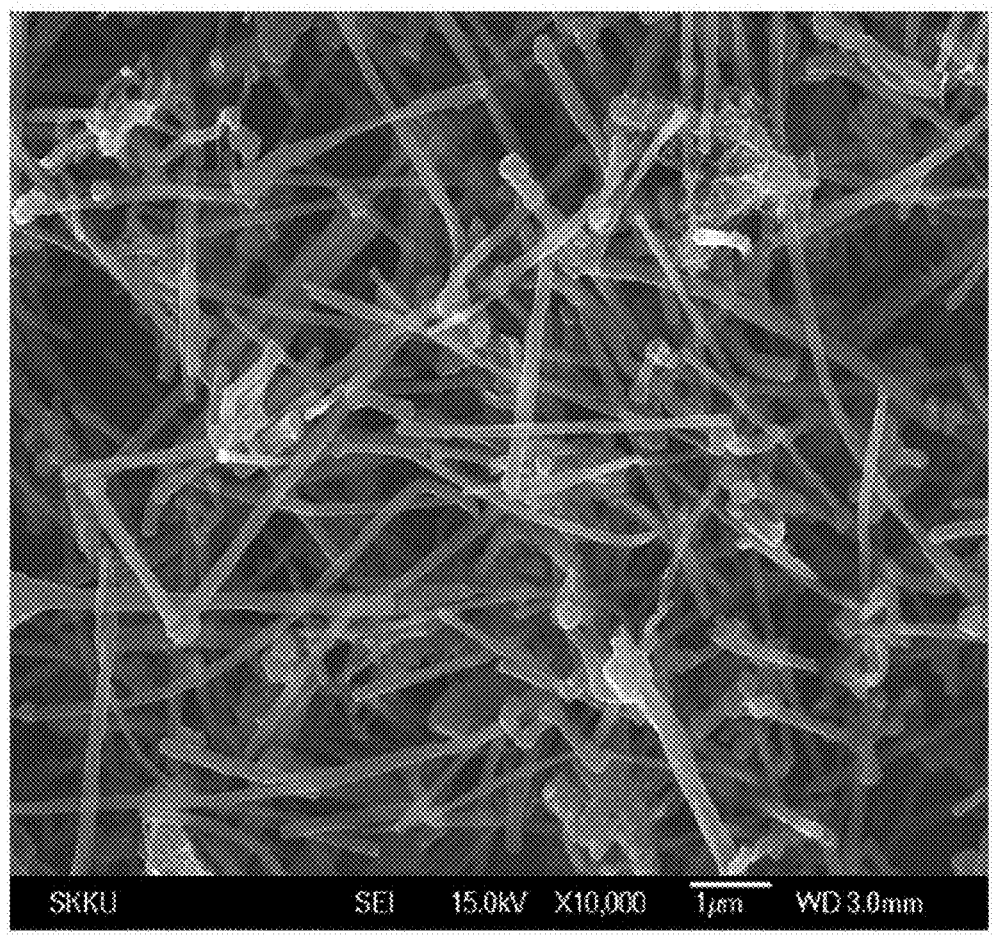
Figure 6D:
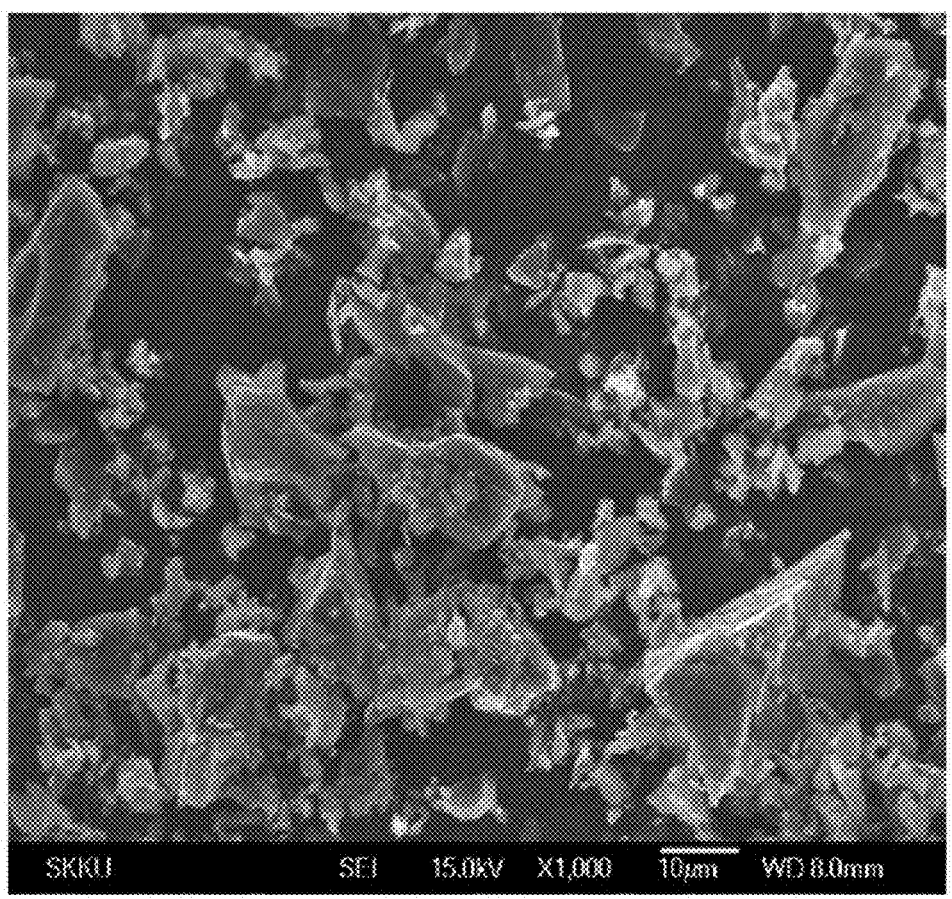

FIG. 4A to FIG. 4D are graphs showing sizes and heights of the graphene quantum dots, which were prepared from the graphite, the carbon nanotube, the carbon fiber, and the charcoal, respectively, by using the solvothermal redox reaction, as measured by using AFM in an Example of the present disclosure. As shown in FIG. 4A to FIG. 4C, it could be identified that the graphene quantum dots prepared from the graphite, the carbon nanotube, and the carbon fiber had 1 to 3 layers. However, as shown in FIG. 4D, it could be identified that the graphene quantum dot prepared from the charcoal had 1 to 10 layers.

FIG. 5A to FIG. 5D are photoluminescence (PL) spectra of the graphene quantum dots, which were prepared from the graphite, the carbon nanotube, the carbon fiber, and the charcoal, respectively, through the solvothermal redox reaction, in an Example of the present disclosure. Referring to FIG. 5A to FIG. 5D, it could be identified that emission peaks of the graphene quantum dots prepared from the graphite and the carbon fiber were about 420 nm, and emission peaks of the graphene quantum dots prepared from the carbon nanotube and the charcoal were about 430 nm.

FIG. 6A to FIG. 6D are SEM images of the graphite, the carbon nanotube, the carbon fiber and the charcoal, respectively, as a starting material, which were used for the solvothermal redox reaction, in an Example of the present disclosure.

Example 2

Preparation of Graphene Quantum Dot Using the Sono Fenton Reaction 1 g graphite (325 mesh Bay Carbon) was mixed with DMF (100 mL) and oxone (1 g) to react the mixture by using an ultra-sonicator for 1 hour. Subsequently, the reactant was filtered by using a 100 nm membrane filter, and then, remaining salt was eliminated through a dialysis bag so that graphene quantum dot was finally obtained.

Figure 7A:
FIG. 7A is an image of the carbon material dispersed in the organic solvent prior to the reaction in an Example of the present disclosure.
Figure 7B:
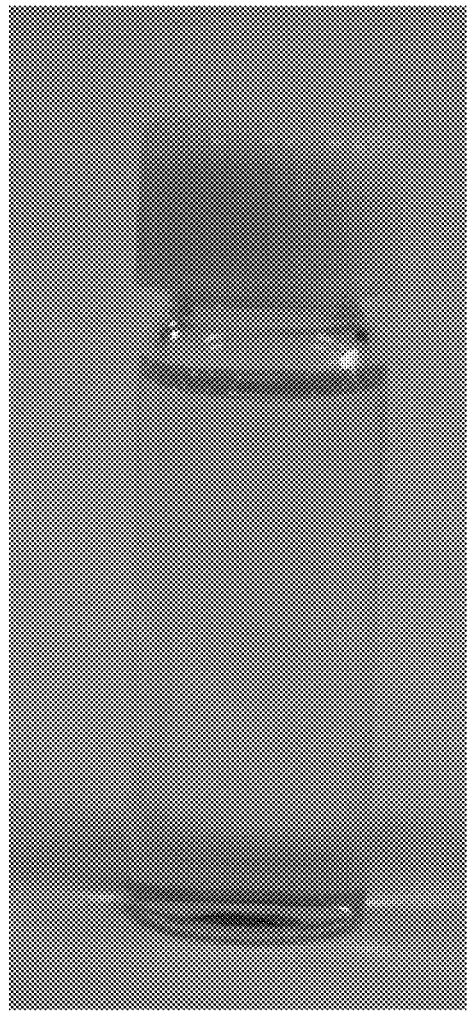
FIG. 7B is an image of the carbon material dispersed in the organic solvent after the sono fenton reaction in an Example of the present disclosure.

FIG. 7A is an image of the graphite dispersed in the organic solvent prior to the reaction, and FIG. 7B is an image of the graphite dispersed in the organic solvent after the sono fenton reaction and the filtering. As shown in FIG. 7A and FIG. 7B, while the graphite material prior to the reaction was in black, a yellow transparent quantum dot solution could be obtained after the filtering.

Example 3

Preparation of Graphene Quantum Dot Using the Sono Photo Fenton Reaction

A 100 mg graphene oxide synthesized by using the Hummers method was mixed with 100 mL DMF and 1 g oxone to react the mixture in an ultra-sonicator (500 W) and an ultraviolet radiator (100 W) for 1 hour. After the reaction, the reactant was filtered through a 100 nm membrane filter, and then, remaining salt was eliminated through a dialysis bag so that graphene quantum dot was finally obtained.

Figure 8A:
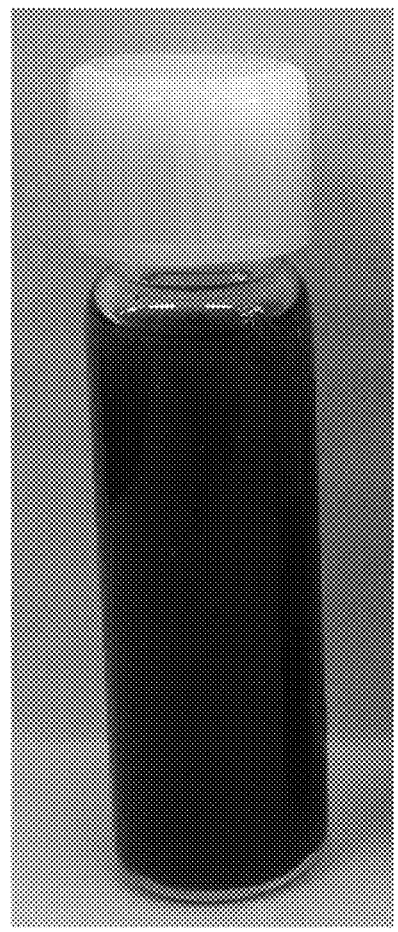
FIG. 8A is an image of the carbon material dispersed in the organic solvent prior to the reaction in an Example of the present disclosure.
Figure 8B:
FIG. 8B is an image of the carbon material dispersed in the organic solvent after the sono fenton reaction in an Example of the present disclosure.
Figure 8C:
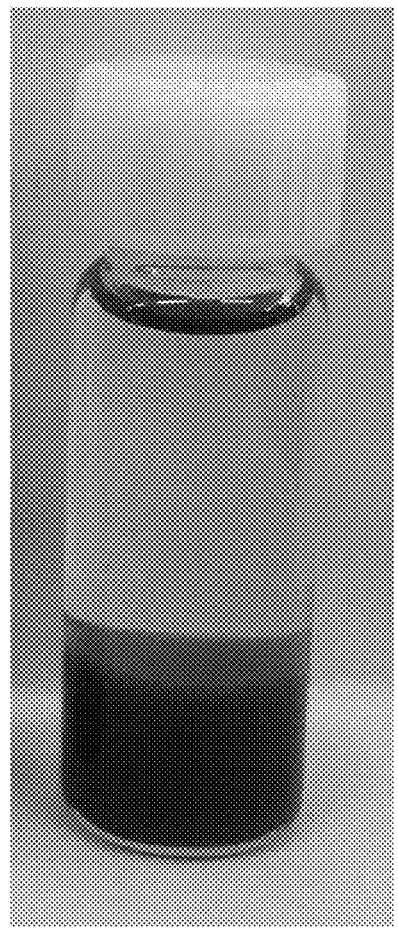
FIG. 8C is an image of the carbon material dispersed in the organic solvent after the sono photo fenton reaction in an Example of the present disclosure.

FIG. 8A is an image of the graphene oxide dispersed in the organic solvent prior to the reaction, FIG. 8B is an image of the graphene oxide dispersed in the organic solvent after the sono fenton reaction, and FIG. 8C is an image of the graphene oxide dispersed in the organic solvent after the sono photo fenton reaction.

Figure 9A:
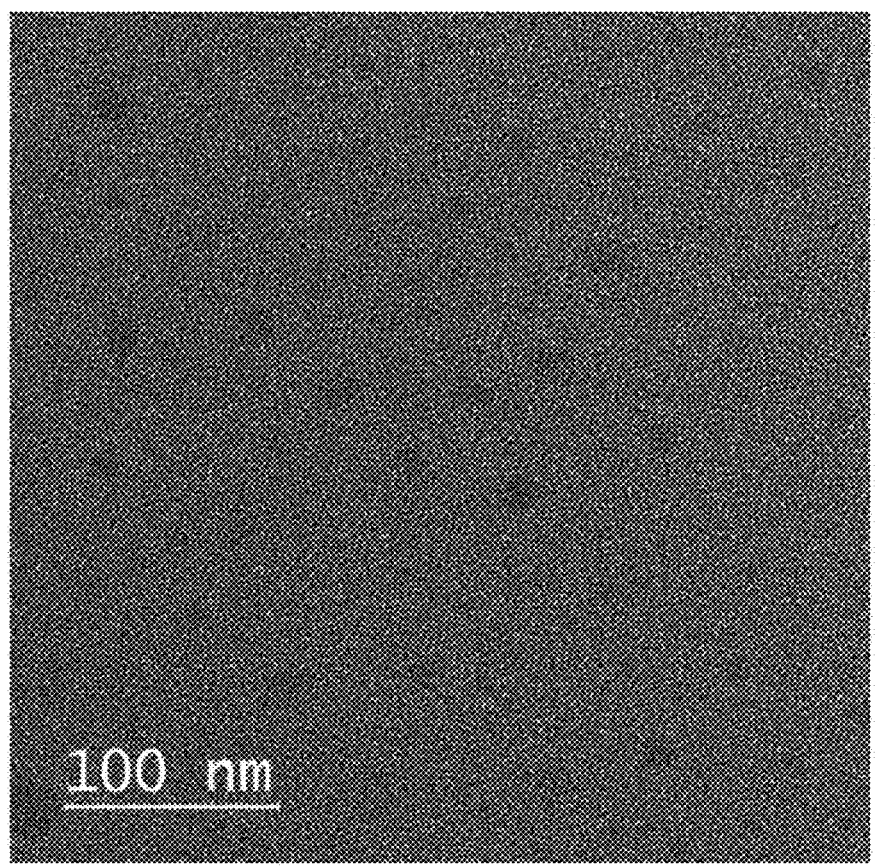
FIG. 9A and FIG. 9B are HR-TEM images of the graphene quantum dot prepared from the graphite by using the sono fenton method in an Example of the present disclosure.
Figure 9B:
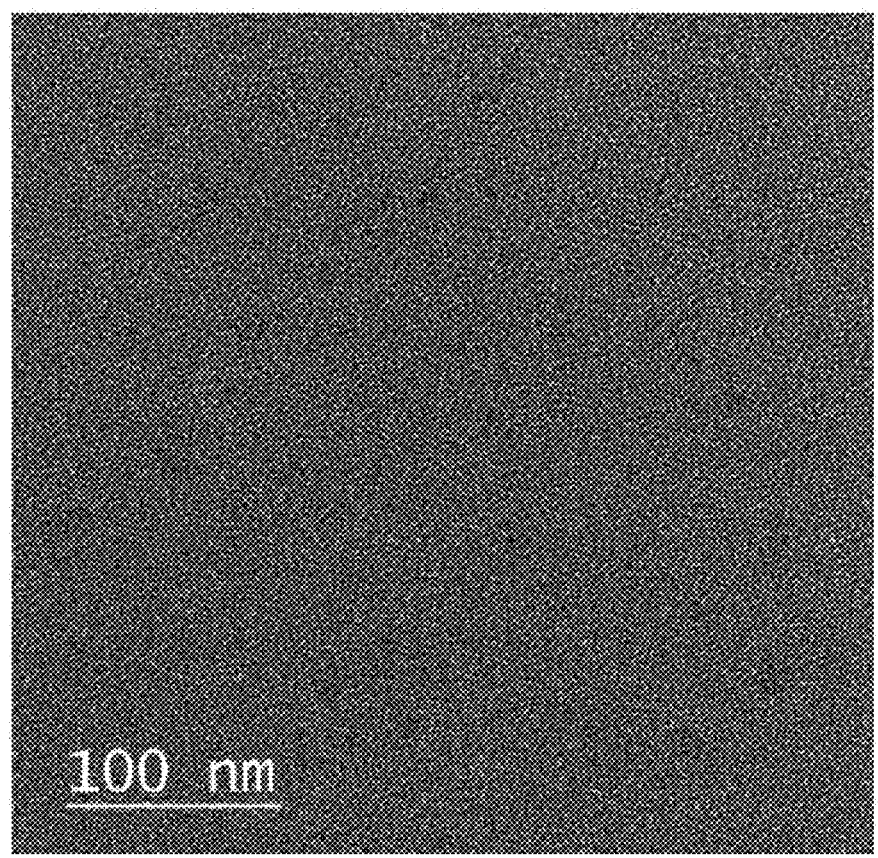

FIG. 9A and FIG. 9B are HR-TEM images of the graphene quantum dot, which was prepared from the graphite by using the sono fenton method, in an Example of the present disclosure. From FIG. 9A and FIG. 9B, it could be identified that the graphene quantum dot prepared from the graphite has a size of 10 nm or less.

Figure 10A:
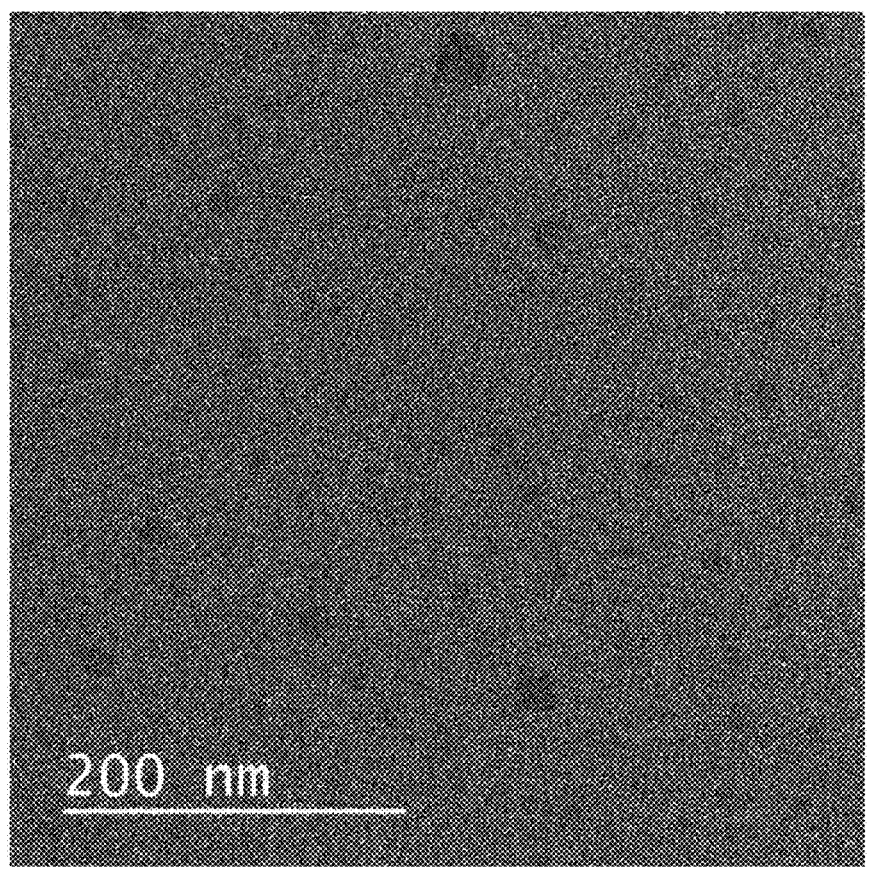
FIG. 10A is an HR-TEM image of the graphene quantum dot prepared from the graphene oxide by using the sono fenton reaction in an Example of the present disclosure.
Figure 10B:
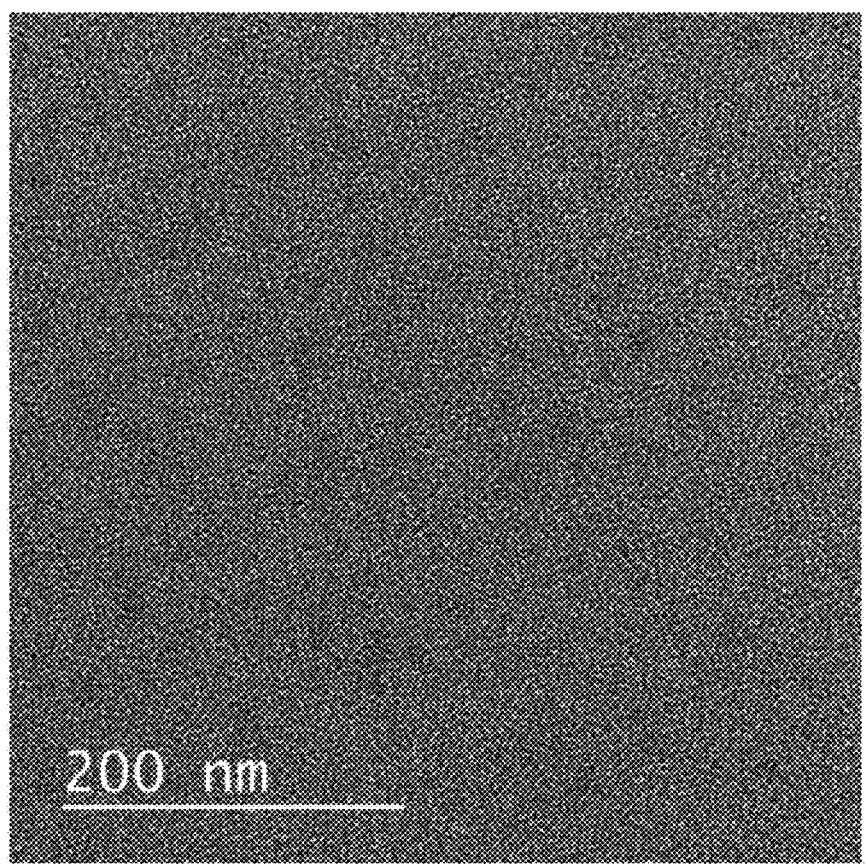
FIG. 10B is a HR-TEM image of the graphene quantum dot prepared from the graphene oxide by using the sono photo fenton reaction in an Example of the present disclosure.

FIG. 10A is a HR-TEM image of the graphene quantum dot, which was prepared from the graphene oxide by using the sono fenton reaction, in an Example of the present disclosure, and FIG. 10B is a HR-TEM image of the graphene quantum dot, which was prepared from the graphene oxide by using the sono photo fenton reaction, in an Example of the present disclosure. As shown in FIG. 10A and FIG. 10B, it could be identified that the size of each of the graphene quantum dots prepared from the graphene oxide by using the sono fenton reaction and the sono photo fenton reaction, respectively, was about 10 nm or less.

Figure 11:
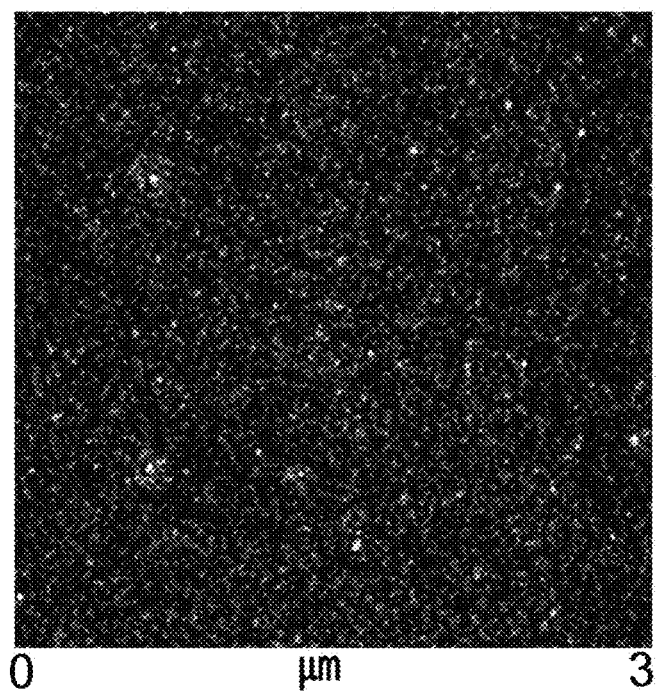
FIG. 11 is a graph for a size and a height of the graphene quantum dot, which was prepared from the graphite by using the sono fenton method, as measured by using AFM in an Example of the present disclosure.
Figure 11:
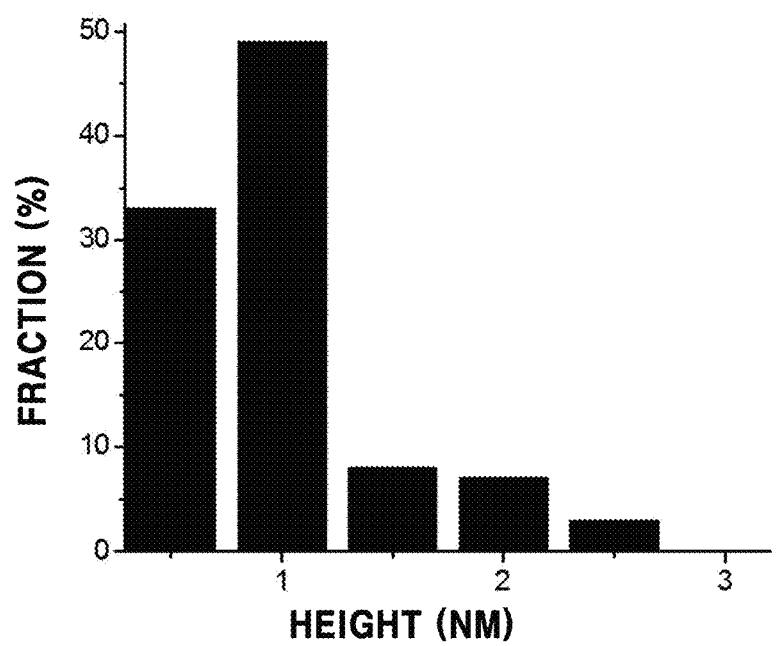

FIG. 11 is a graph for a size and a height of the graphene quantum dot, which was prepared from the graphite by using the sono fenton method, as measured by using AFM in an Example of the present disclosure. As shown in FIG. 11, it could be identified that the height of the graphene quantum dot prepared from the graphite was from about 1 nm to about 3 nm, and the graphene quantum dot had one (1) layer or two (2) layers.

Figure 12A:
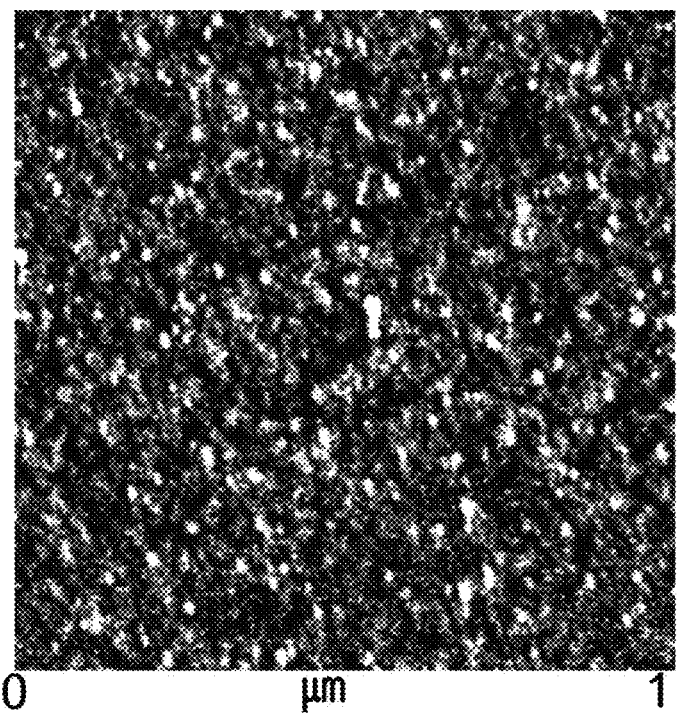
FIG. 12A is a graph for a size and a height of the graphene quantum dot, which was prepared from the graphene oxide through the sono fenton reaction, as measured by using AFM in an Example of the present disclosure.
Figure 12A:
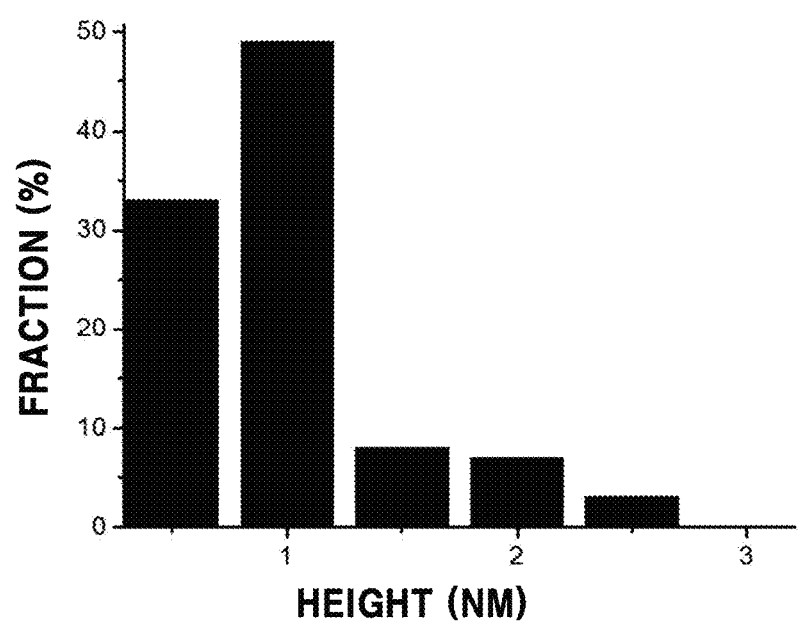
Figure 12B:
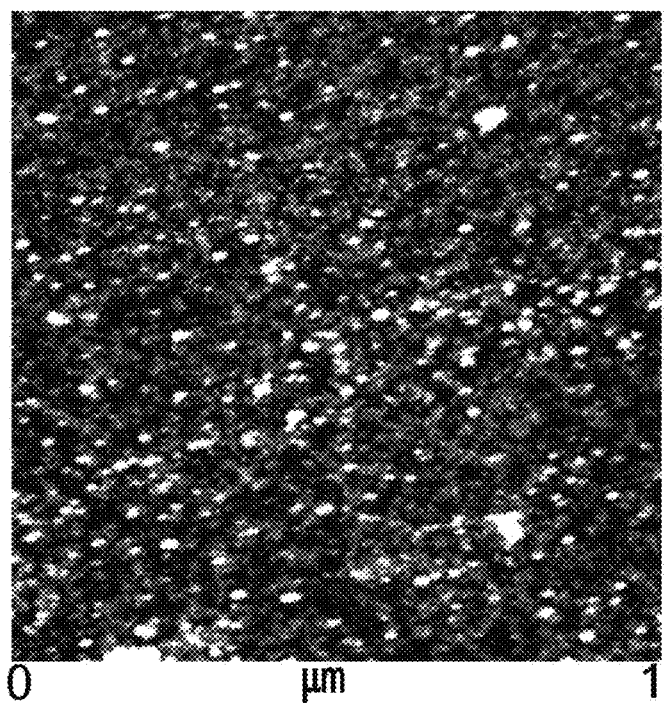
FIG. 12B is a graph for a size and a height of the graphene quantum dot, which was prepared from the graphene oxide through the sono photo fenton reaction, as measured by using AFM in an Example of the present disclosure.
Figure 12B:
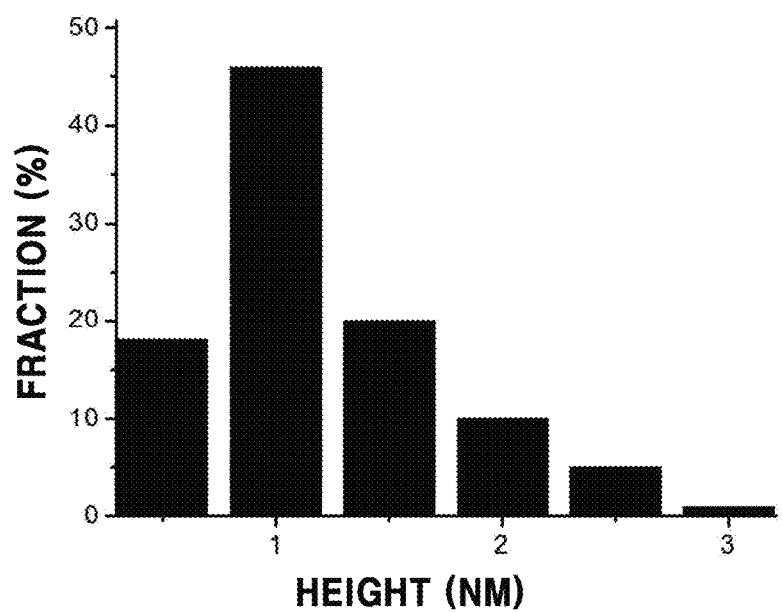

FIG. 12A is a graph for a size and a height of the graphene quantum dot, which was prepared from the graphene oxide through the sono fenton reaction, as measured by using AFM in an Example of the present disclosure, and FIG. 12B is a graph for a size and a height of the graphene quantum dot, which was prepared from the graphene oxide through the sono photo fenton reaction, as measured by using AFM in an Example of the present disclosure. It could be identified that both the graphene quantum dots prepared from the graphene oxide through the sono fenton reaction and the sono photo fenton reaction had one (1) to two (2) layers.

Figure 13A:
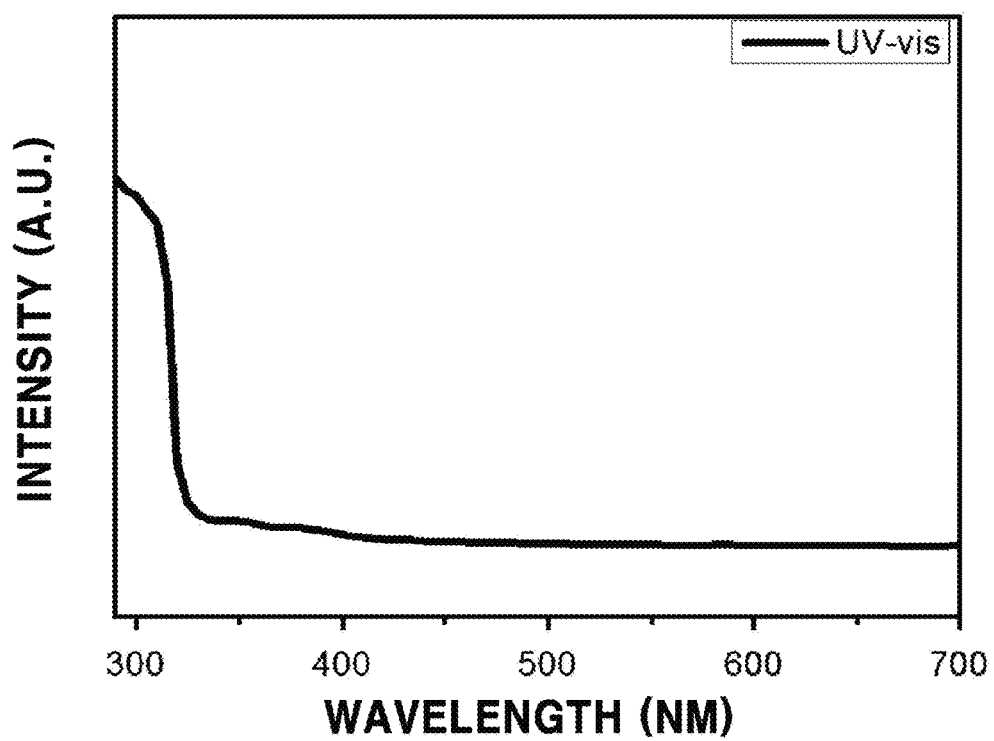
FIG. 13A is an ultraviolet-visible (UV-vis) absorption spectrum of the graphene quantum dot prepared from the graphite by using the sono fenton method in an Example of the present disclosure.
Figure 13B:
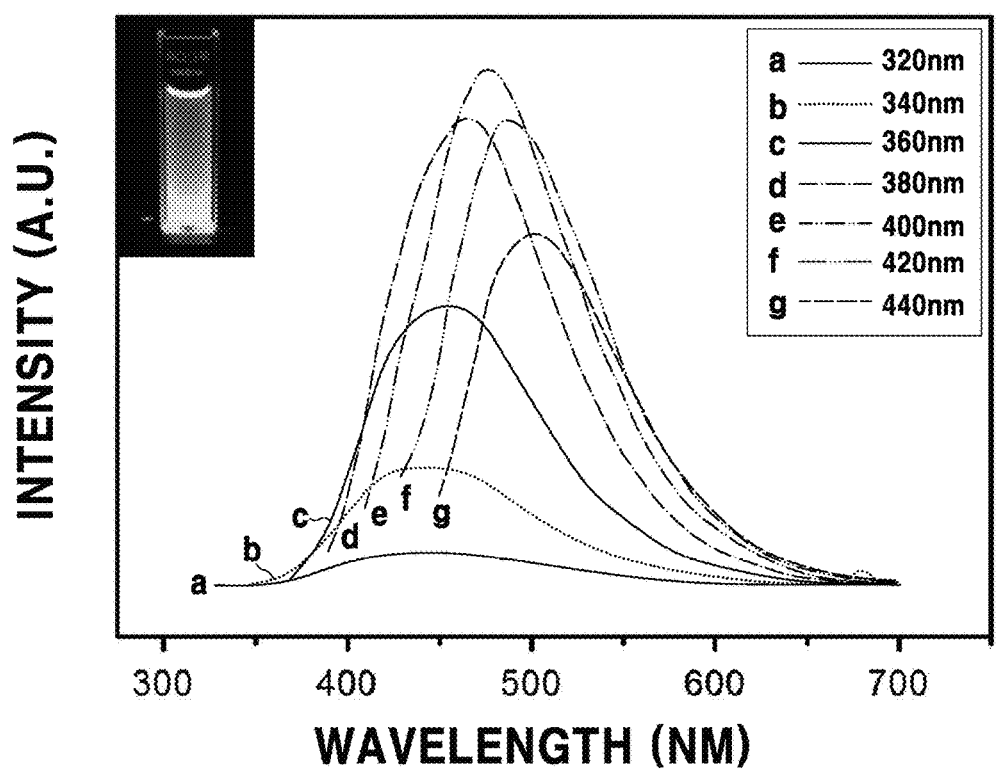
FIG. 13B is a PL spectrum of the graphene quantum dot prepared from the graphite in an Example of the present disclosure.

FIG. 13A is an ultraviolet-visible (UV-vis) absorption spectrum of the graphene quantum dot, which was prepared from the graphite by using the sono fenton method, in an Example of the present disclosure, and FIG. 13B is a PL spectrum of the graphene quantum dot, which was prepared from the graphite by using the sono fenton method, in an Example of the present disclosure. The UV-vis absorption spectrum of the graphene quantum dot prepared from the graphite was 350 nm, and a emission peak thereof was about 470 nm.

Figure 14A:
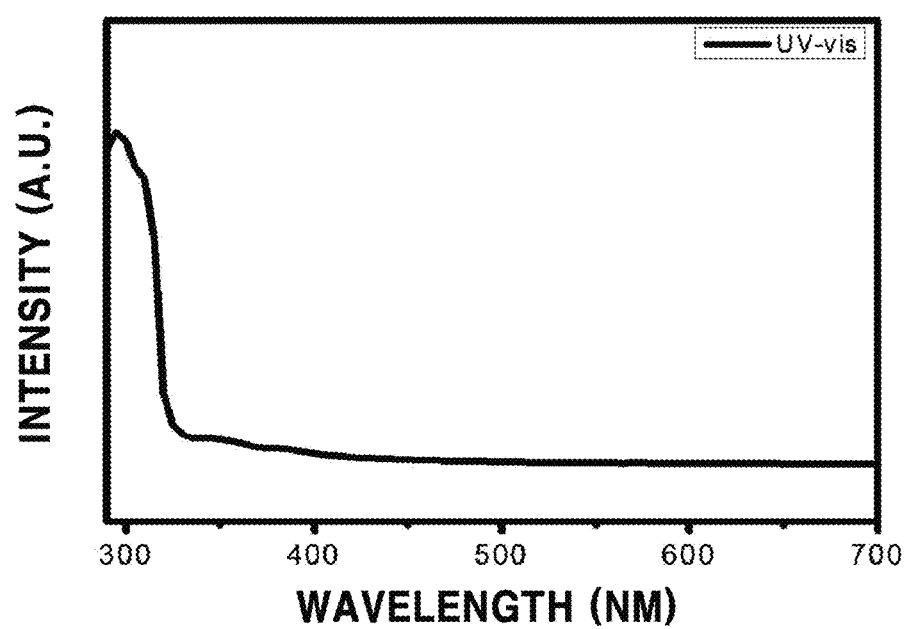
FIG. 14A is an UV-vis absorption spectrum of the graphene quantum dot prepared from the graphene oxide through the sono fenton reaction in an Example of the present disclosure.
Figure 14B:
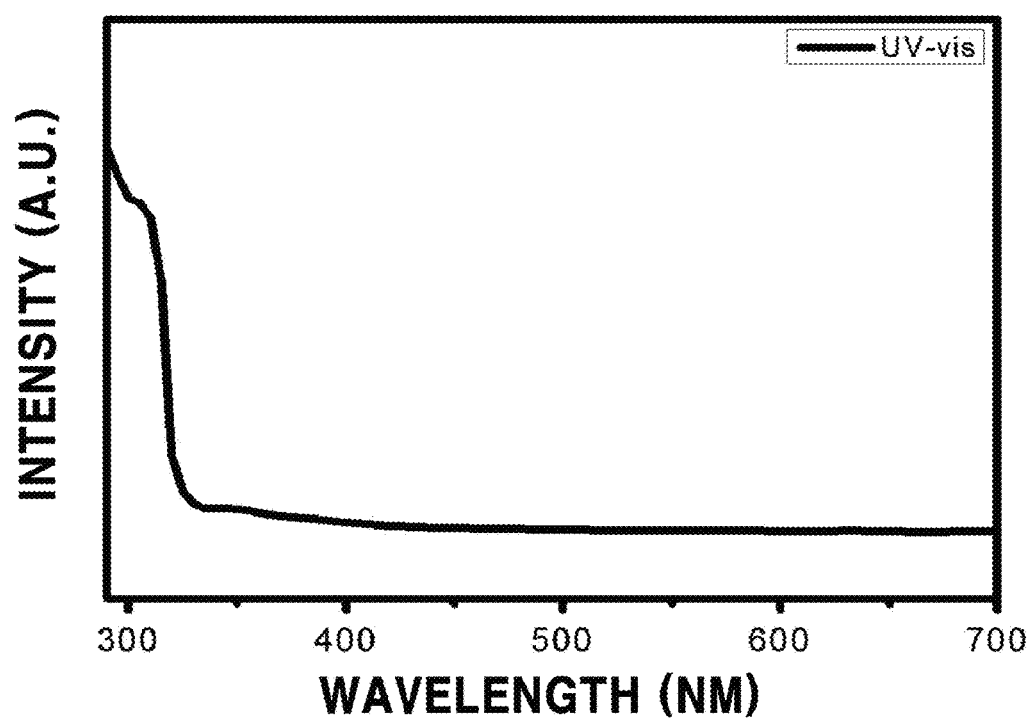
FIG. 14B is a UV-vis absorption spectrum of the graphene quantum dot prepared from the graphene oxide through the sono photo fenton reaction in an Example of the present disclosure.
Figure 14C:
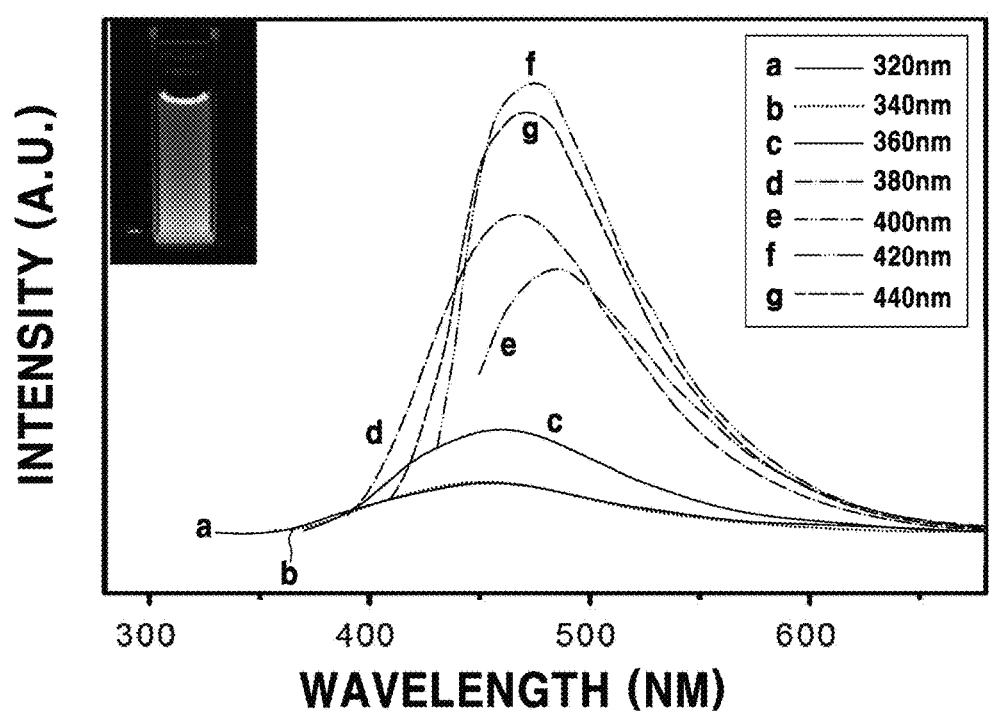
FIG. 14C is a PL spectrum of the graphene quantum dot prepared from the graphene oxide through the sono fenton reaction in an Example of the present disclosure.
Figure 14D:
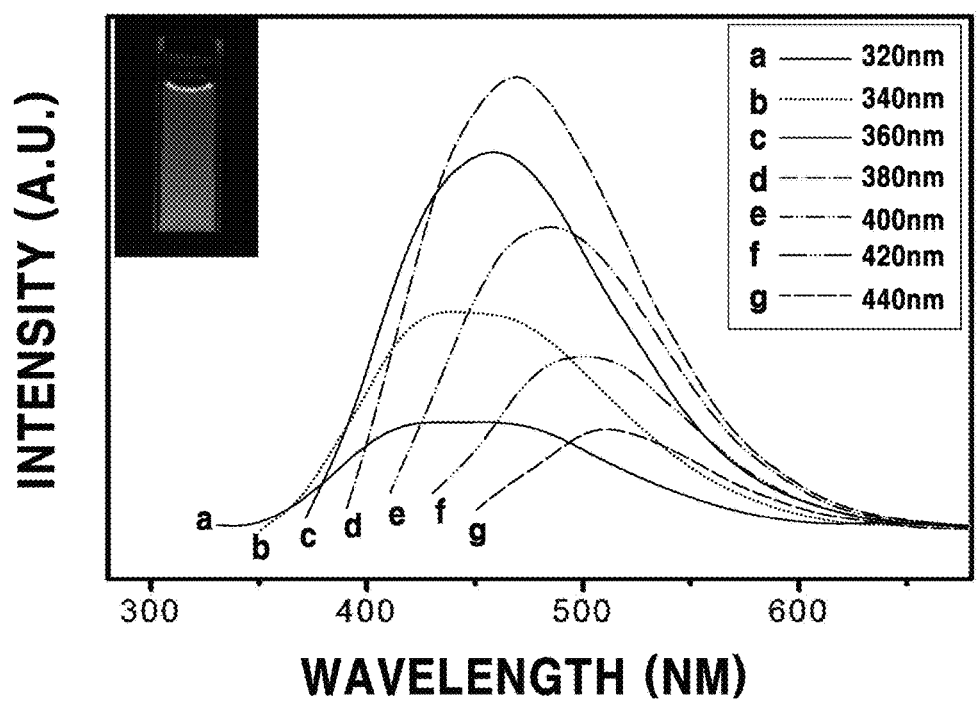
FIG. 14D is a PL spectrum of the graphene quantum dot prepared from the graphene oxide through the sono photo fenton reaction in an Example of the present disclosure.

FIG. 14A is a UV-vis absorption spectrum of the graphene quantum dot, which was prepared from the graphene oxide through the sono fenton reaction, in an Example of the present disclosure, FIG. 14B is a UV-vis absorption spectrum of the graphene quantum dot, which was prepared from the graphene oxide through the sono photo fenton method, in an Example of the present disclosure, FIG. 14C is a PL spectrum of the graphene quantum dot, which was prepared from the graphene oxide through the sono fenton reaction, in an Example of the present disclosure, and FIG. 14D is a PL spectrum of the graphene quantum dot, which was prepared from the graphene oxide through the sono photo fenton reaction, in an Example of the present disclosure. As shown in FIG. 14A and FIG. 14C, it could be identified that the UV-vis absorption spectrum of the graphene quantum dot prepared from the graphene oxide through the sono fenton reaction was 350 nm, and a emission peak thereof was about 470 nm. As shown in FIG. 14B and FIG. 14D, it could be identified that the UV-vis absorption spectrum of the graphene quantum dot prepared from the graphene oxide through the sono photo fenton reaction was 350 nm, and a emission peak thereof was about 460 nm.

Figure 15A:
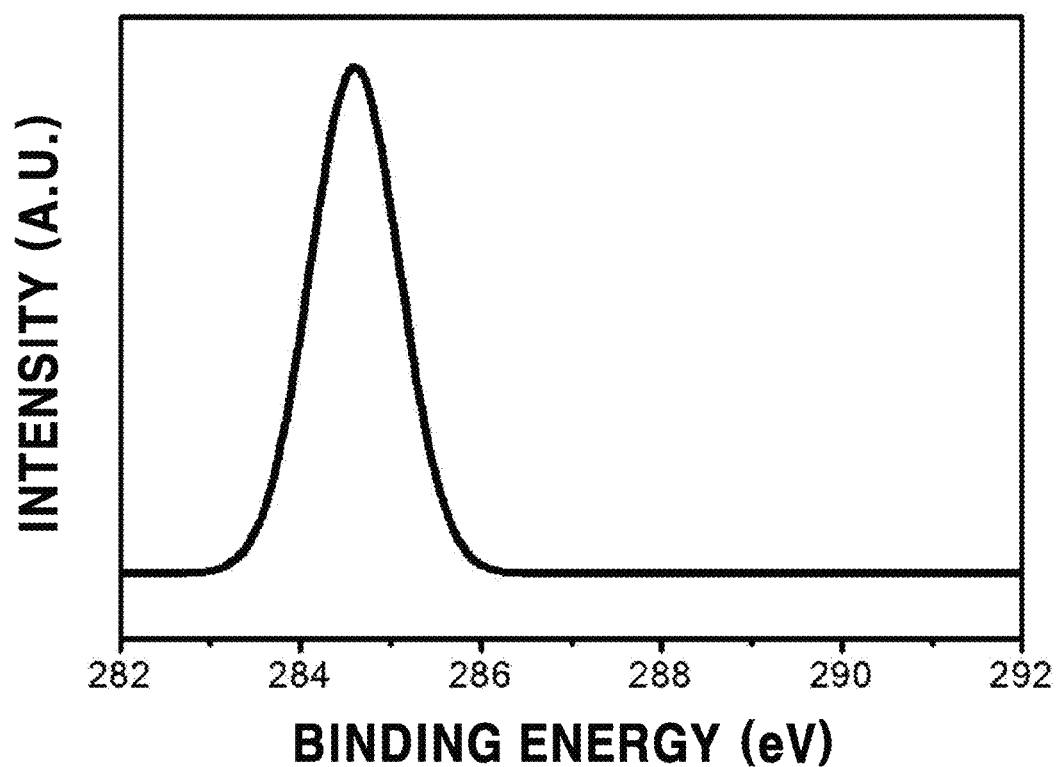
FIG. 15A is a graph showing an X-ray photoelectron spectroscopy (XPS) of the graphite in an Example of the present disclosure.
Figure 15B:
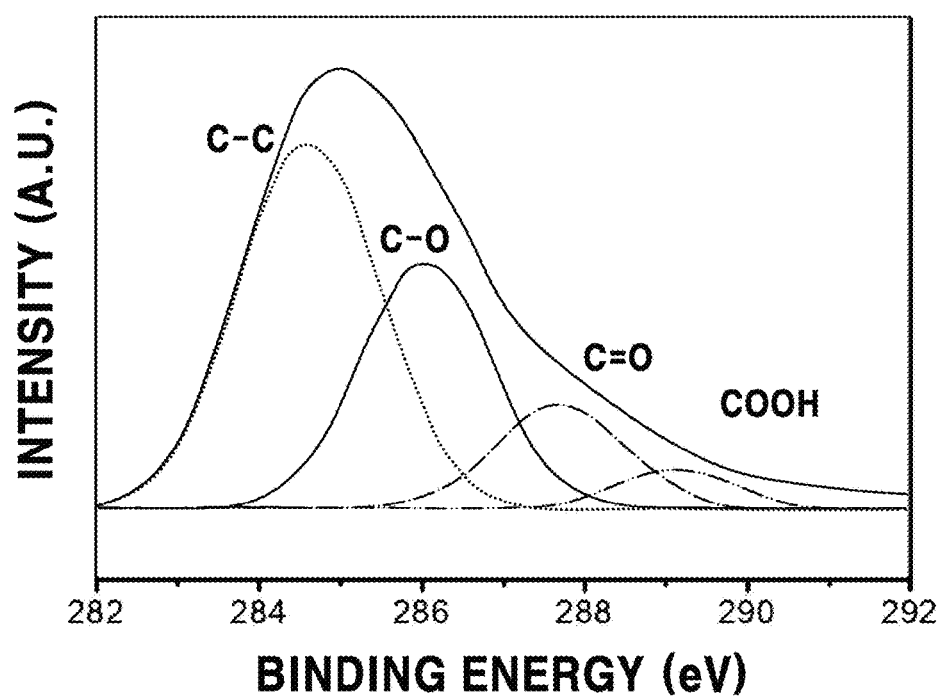
FIG. 15B is an oxygen ratio analysis graph of the graphene quantum dot, which was prepared from the graphite through the sono fenton method, as measured by using XPS in an Example of the present disclosure.

FIG. 15A is a graph showing X-ray photoelectron spectroscopy (XPS) of the graphite in an Example of the present disclosure, and FIG. 15B is an oxygen ratio analysis graph for the graphene quantum dot, which was prepared from the graphite through the sono fenton method, as measured by using XPS in an Example of the present disclosure. Graphite mostly consists of combination of carbon materials, but since various functional groups such as OH, COOH, C=O or others are assigned to the graphene quantum dot prepared from the graphite according to the Examples, it was deemed that the oxygen ratio of the graphene quantum dot according to the Examples is higher than the graphite.

Figure 16A:
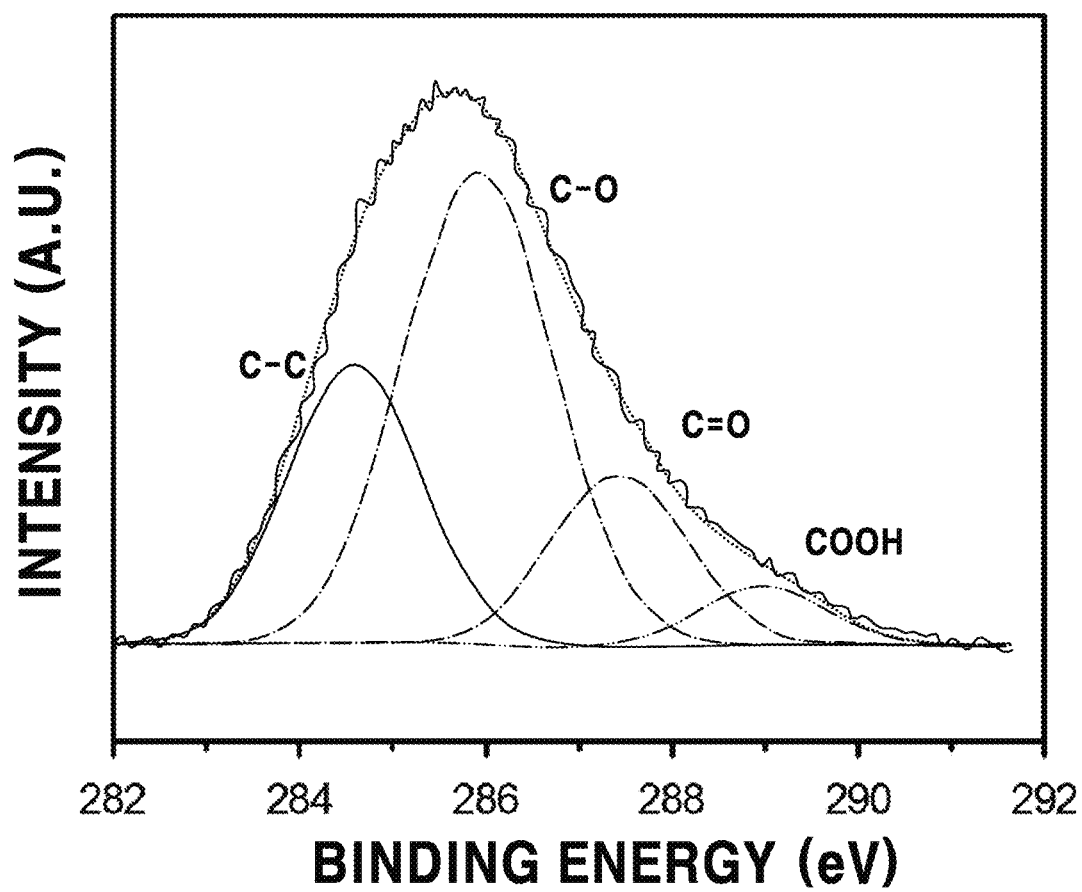
FIG. 16A is an oxygen ratio analysis graph of the graphene quantum dot, which was prepared from the graphene oxide through the sono fenton reaction, as measured by using XPS in an Example of the present disclosure.
Figure 16B:
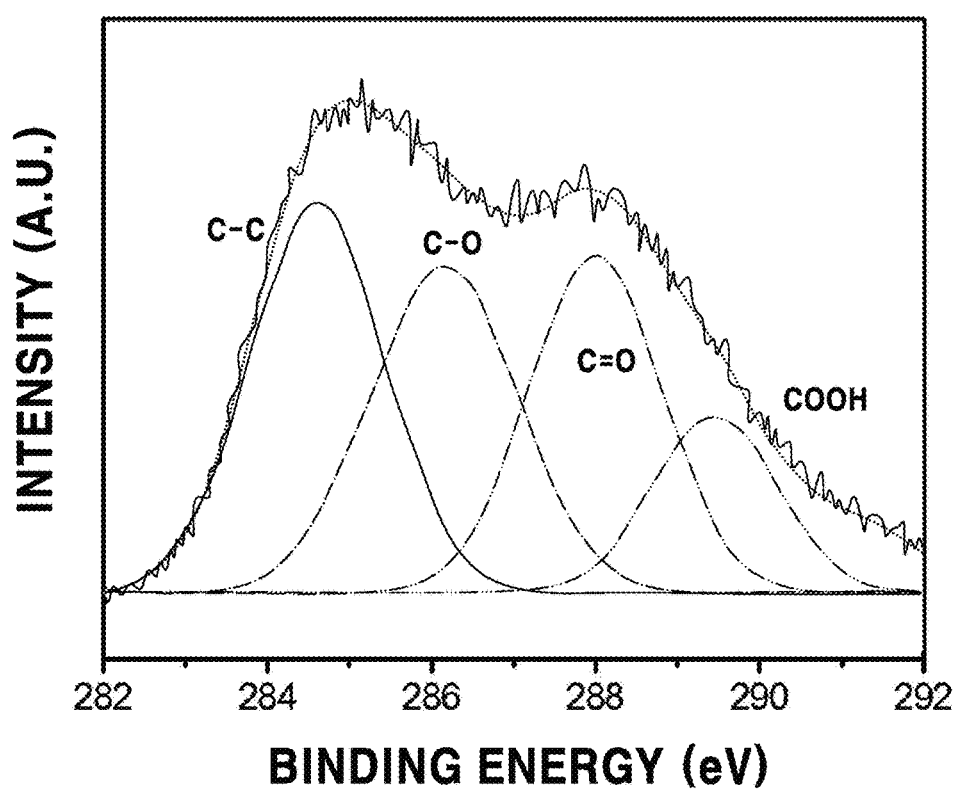
FIG. 16B is an oxygen ratio analysis graph of the graphene quantum dot, which was prepared from the graphene oxide through the sono photo fenton reaction, as measured by using XPS in an Example of the present disclosure.

FIG. 16A is an oxygen ratio analysis graph for the graphene quantum dot, which was prepared from the graphene oxide through the sono fenton reaction, as measured by using XPS in an Example of the present disclosure, and FIG. 16B is an oxygen ratio analysis graph for the graphene quantum dot, which was prepared from the graphene oxide through the sono photo fenton reaction, as measured by using XPS in an Example of the present disclosure. As shown in FIG. 16A and FIG. 16B, it was identified that an oxygen ratio content of the graphene quantum dot prepared by the sono fenton method is smaller than that of the graphene quantum dot prepared by the sono photo fenton reaction. However, it could be identified that the graphene quantum dots are different from each other merely in terms of the oxygen ratio content and contain the same functional group.

Figure 17:
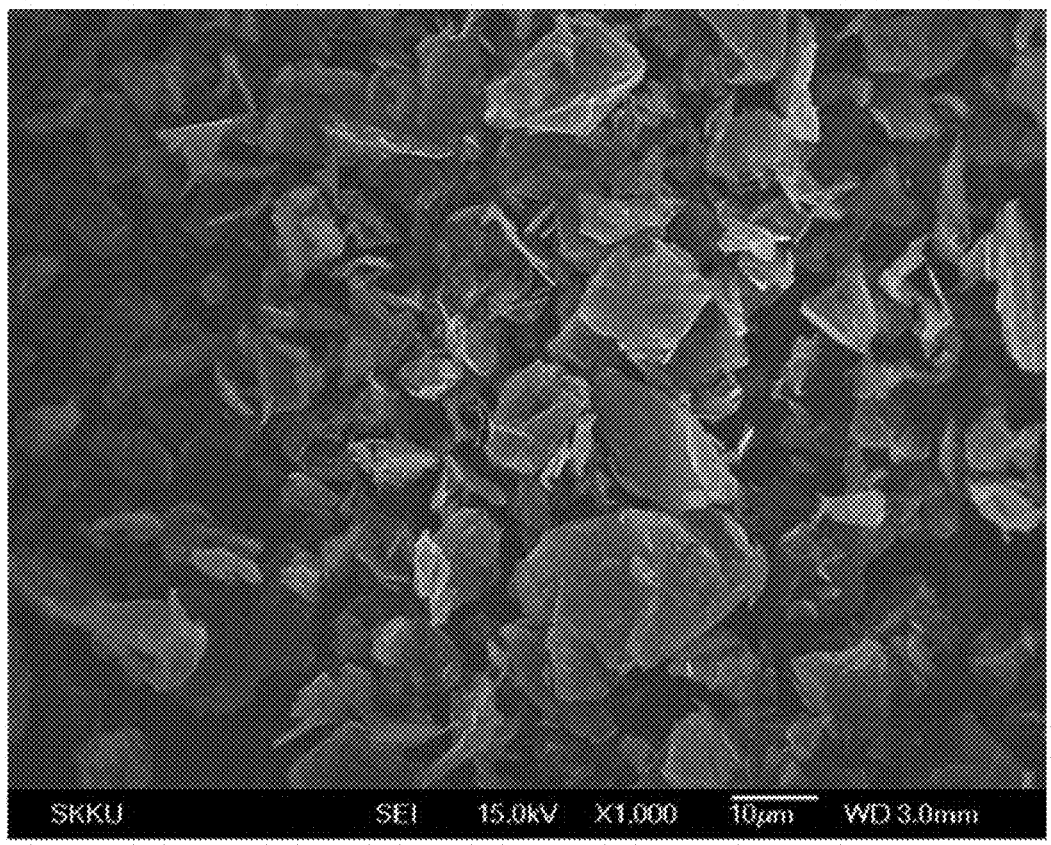
FIG. 17 is a SEM image of the graphite in an Example of the present disclosure.

FIG. 17 is an SEM image of the graphite prior to the reaction in an Example of the present disclosure.

Figure 18A:
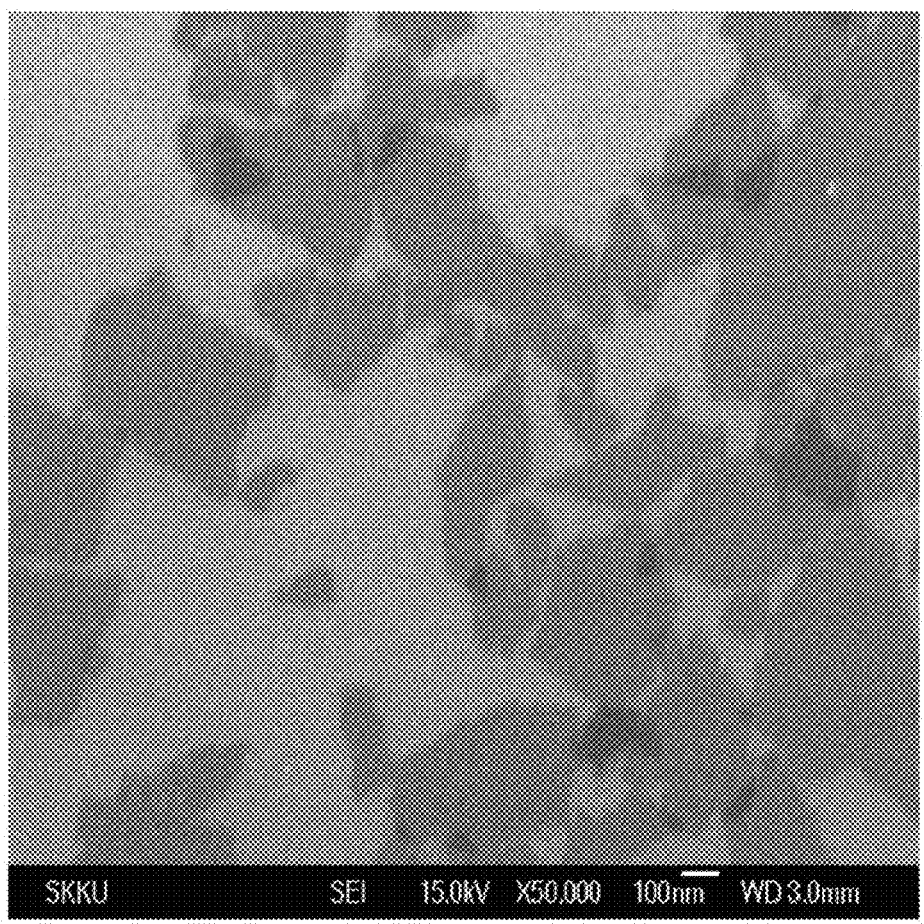
FIG. 18A is a SEM image of the graphene oxide in an Example of the present disclosure.
Figure 18B:
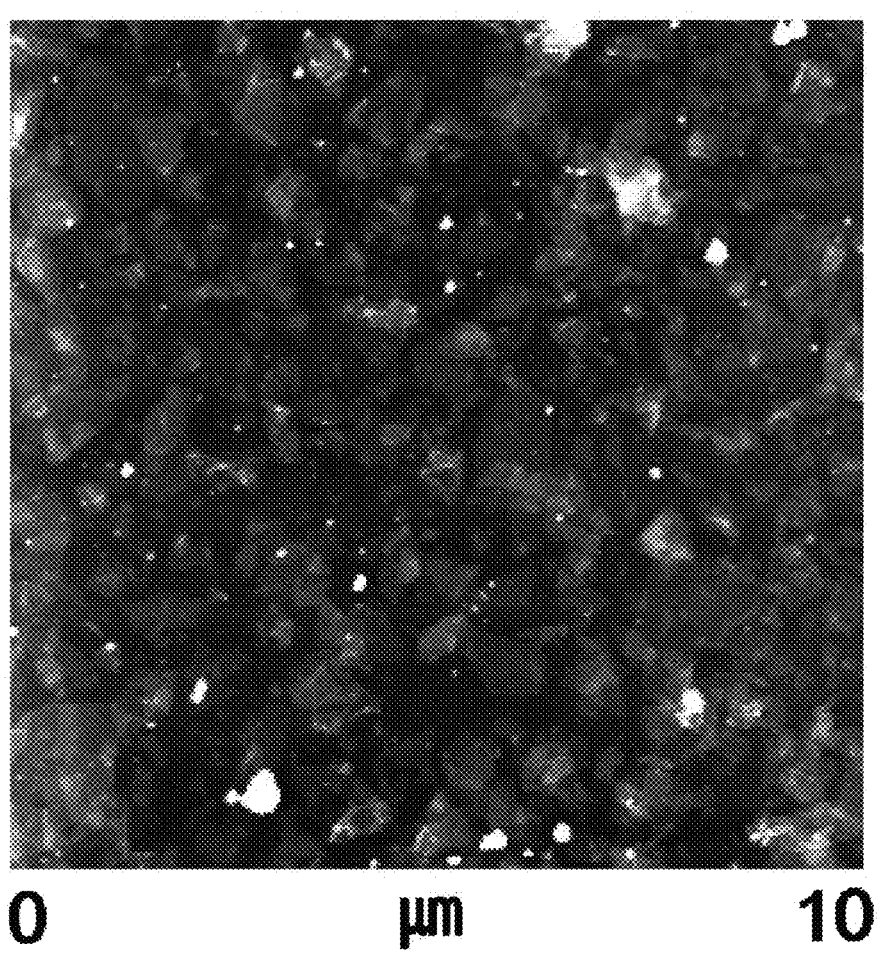
FIG. 18B is an AFM image of the graphene oxide, in an Example of the present disclosure.

FIG. 18A is an SEM image of the graphene oxide prior to the reaction in an Example of the present disclosure, and FIG. 18B is an AFM image of the graphene oxide prior to the reaction in an Example of the present disclosure.

The above description of the present disclosure is provided for the purpose of illustration, and it would be understood by those skilled in the art that various changes and modifications may be made without changing technical conception and essential features of the present disclosure. Thus, it is clear that the above-described Examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:
1. A method for preparing graphene quantum dot, comprising:
adding potassium peroxymonosulfate (oxone) to a carbon material in a neutral solution to form graphene quantum dot through a solvothermal redox reaction of the carbon material.

2. The method of claim 1,
wherein the carbon material is dispersed in an organic solvent.

3. The method of claim 2,
wherein the organic solvent includes a member selected from the group consisting of dimethylformamide, an alcohol containing 1 to 5 carbon atoms, dichloromethane, N-methylpyrrolidone, and combinations thereof.

4. The method of claim 1,
wherein the solvothermal redox reaction of the carbon material includes oxidizing the carbon material by adding the potassium peroxymonosulfate to the carbon material, and reducing the oxidized carbon material by performing a hydrothermal reaction.

5. The method of claim 1,
wherein the sono fenton reaction of the carbon material is performed by sonication to the carbon material to which the potassium peroxymonosulfate has been added.

6. The method of claim 1,
wherein the sono photo fenton reaction of the carbon material is performed by UV irradiation and sonication to the carbon material to which the potassium peroxymonosulfate has been added.

7. The method of claim 1,
wherein the carbon material includes a member selected from the group consisting of graphite, a carbon nanotube, a carbon fiber, charcoal, and combinations thereof.

8. Graphene quantum dot, which is prepared by the method according to claim 1,
wherein the graphene quantum dot has a size of 100 nm or less and a height of 10 nm or less.

9. A method for preparing graphene quantum dot, comprising:
adding potassium peroxymonosulfate (oxone) to a carbon material in a neutral solution to form graphene quantum dot through a sono fenton reaction of the carbon material.

10. A method for preparing graphene quantum dot, comprising:

adding potassium peroxymonosulfate (oxone) to a carbon material in a neutral solution to form graphene quantum dot through a sono photo fenton reaction of the carbon material.

* * * * *